United States Patent
Schneider et al.

(10) Patent No.: US 9,563,662 B2
(45) Date of Patent: Feb. 7, 2017

(54) DETECTING AND PROCESSING CACHE HITS FOR QUERIES WITH AGGREGATES

(75) Inventors: Donovan Alfred Schneider, San Francisco, CA (US); Edward Shaw-Lee Suen, San Francisco, CA (US); Kazi Atif-Uz Zaman, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1846 days.

(21) Appl. No.: 11/931,947

(22) Filed: Oct. 31, 2007

(65) Prior Publication Data

US 2008/0077557 A1   Mar. 27, 2008

Related U.S. Application Data

(62) Division of application No. 10/186,344, filed on Jun. 27, 2002, now Pat. No. 7,499,910.

(51) Int. Cl.
*G06F 7/00* (2006.01)
*G06F 17/30* (2006.01)

(52) U.S. Cl.
CPC .............................. *G06F 17/30483* (2013.01)

(58) Field of Classification Search
CPC ............. Y10S 707/99932; Y10S 707/99933; Y10S 707/99943; G06F 17/30457; G06F 17/3046; G06F 17/30471
USPC ........................ 707/4–5, 713–715, 765–767
See application file for complete search history.

(56) References Cited

U.S. PATENT DOCUMENTS

| | | | |
|---|---|---|---|
| 5,727,196 A * | 3/1998 | Strauss et al. | 707/696 |
| 5,781,896 A * | 7/1998 | Dalal | |
| 6,073,129 A | 6/2000 | Levine et al. | 707/4 |
| 6,202,060 B1 | 3/2001 | Tran | 707/3 |
| 6,347,314 B1 | 2/2002 | Chidlovskii | 707/3 |
| 6,438,594 B1 * | 8/2002 | Bowman-Amuah | 709/225 |
| 6,446,062 B1 * | 9/2002 | Levine | G06F 17/30404 707/690 |
| 6,466,931 B1 | 10/2002 | Attaluri et al. | 707/2 |
| 6,601,062 B1 * | 7/2003 | Deshpande et al. | 707/3 |
| 6,618,719 B1 * | 9/2003 | Andrei | G06F 17/30471 |
| 6,629,094 B1 * | 9/2003 | Colby et al. | 707/4 |
| 6,708,166 B1 * | 3/2004 | Dysart et al. | 707/765 |
| 6,732,091 B1 * | 5/2004 | Middelfart | 707/718 |
| 6,950,823 B2 * | 9/2005 | Amiri et al. | 707/690 |
| 7,188,100 B2 * | 3/2007 | De Bellis et al. | 707/706 |

(Continued)

*Primary Examiner* — Tony Mahmoudi
*Assistant Examiner* — Linh Black
(74) *Attorney, Agent, or Firm* — Sheppard Mullin Richter & Hampton LLP

(57) ABSTRACT

Techniques to improve query caching performance by efficiently selecting queries stored in a cache for evaluation and increasing the cache hit rate by allowing for inexact matches. A list of candidate queries stored in the cache that potentially could be used to answer a new query is first determined. This list may include all cached queries, cached queries containing exact matches for select list items, or cached queries containing exact and/or inexact matches. Each of at least one candidate query is then evaluated to determine whether or not there is a cache hit, which indicates that the candidate query could be used to answer the new query. The evaluation is performed using a set of rules that allows for inexact matches of aggregates, if any, in the new query. A query plan is generated for the new query based on a specific candidate query with a cache hit.

20 Claims, 12 Drawing Sheets

(56) References Cited

U.S. PATENT DOCUMENTS

| | | | |
|---|---|---|---|
| 2001/0049685 A1* | 12/2001 | Carey et al. | 707/103 R |
| 2002/0099691 A1 | 7/2002 | Lore et al. | 707/2 |
| 2002/0129032 A1* | 9/2002 | Bakalash et al. | 707/101 |
| 2003/0200194 A1* | 10/2003 | Arnold et al. | 707/1 |
| 2004/0230572 A1 | 11/2004 | Omoigui | 707/3 |

* cited by examiner

510

Aggregate Index

| Key | Data Item | |
|---|---|---|
| qtysold | sum(qtysold),<br>sum(qtysold BY siteid),<br>sum(qtysold BY month),<br>max(qtysold) | 516 |
| revenue | sum(revenue BY siteid, productid),<br>sum(revenue BY siteid, month),<br>sum(revenue BY productid) | |
| units | max(units BY country) | |
| price | min(price BY siteid) | |
| ⋮ | ⋮ | |

DETECTING AND PROCESSING CACHE HITS FOR QUERIES WITH AGGREGATES

CROSS-REFERENCE TO RELATED APPLICATIONS

The present patent application is a divisional of U.S. patent application Ser. No. 10/186,344, filed on Jun. 27, 2002 now U.S. Pat. No. 7,499,910, entitled "Detecting and Processing Cache Hits for Queries with Aggregates" and is incorporated by reference herein in its entirety and for all purposes.

BACKGROUND OF THE INVENTION

The present invention relates generally to computer processing, and more particularly to techniques for detecting and processing cache hits for queries with aggregates.

Decision support systems are commonly available to assist businesses make proper decisions based on data that may be available from a myriad of different data sources. For example, analytics applications are available to simplify data analysis for specific business or functional areas, such as sales and marketing management, customer relationship management (CRM), financial management, inventory management, category management, and so on. Decision support systems collect and transform data from these various data sources into more meaningful and understandable information to end-users.

A major goal of decision support systems is to provide end-users with results to business questions quickly and accurately. Business questions may be translated to "queries" by a query server, and the queries are then "run" against databases. Depending on the complexity of the queries, a long time may be required by the servers for these databases to return results to the queries. In general, it is desirable to be able to return the results to the end-users as fast as possible.

The processing of queries consumes large amounts of resources at the query and database servers and the computer network that interconnects these servers. The query server normally parses each query received from an end-user into "physical" queries against each database where data for the final results may be stored. The query server would then receive intermediate results from all queried databases and perform any required post-processing to obtain the final results.

Query caching may be used to improve performance by avoiding unnecessary processing. With query caching, the results of prior queries are stored in a local cache, which may be implemented on a storage unit (e.g., a memory unit or a disk drive) that can be more quickly and easily accessed by the query server. If a new query is subsequently received and can use the results stored in the cache, then the database processing for the new query can be avoided. This may then result in a dramatic improvement in the average response time for queries. Besides faster response time, the ability to answer a new query from a local cache conserves resources at (1) the query server, since post processing on the intermediate results received from queried databases may be avoided, (2) the database server, which may then be able to perform other processing, and (3) the network, since intermediate results do not have to be sent over the network to the query server.

The effectiveness of query caching is dependent on the ability to determine whether or not the results for queries that have been saved in the cache (i.e., cached queries) may be used to obtain the results for a new query. In the simple case in which a new query is exactly like one of the cached queries, the results for this cached query may be quickly retrieved and presented to the end-user. However, in many instances, the new query will not be exactly like any of the cached queries.

A major challenge with query caching is then the ability to determine whether or not results for a new query may be obtained from results for a cached query. This will be possible if the new query is a subset of and "subsumed" by the cached query. A cache hit may be declared if the new query can be answered by the cached query, and a cache miss may be declared otherwise.

In one conventional scheme for determining whether or not a new query can be answered by a cached query, the new query is evaluated against each cached query. This scheme provides acceptable performance when the number of cached queries is small (e.g., tens of cached queries), but would be ineffective when the number of cached queries is large (e.g., hundreds or thousands of cached queries).

The determination of whether or not a new query is subsumed by a cached query is also made more challenging by the fact that queries often ask for "aggregated" data, which is data obtained by operating on multiple data entries. For example, a query may ask for the sum of all revenues for each year, which may then be obtained by summing the revenues for all transactions of each year. In this example, "transactions" would be the data entries and "sum" is the aggregation being performed on the data entries. In the process of aggregating data, the value of each individual data entry is lost (i.e., the value of each transaction is not available, in the above example).

Conventionally, for a new query with one or more aggregates to be considered subsumed by a cached query, the aggregates of the new query are required to exactly match the aggregates of the cached query or fall within a very limited range of exceptions. This strict aggregate matching criterion can often result in declaration of a cache miss when in fact the results for the new query may be obtained from the results from the cached query. The ability to detect cache hits may be even more important for queries with aggregates because additional savings may be achieved from not having to perform the aggregation.

As can be seen, techniques that can be used to improve query caching in the presence of aggregates are highly desirable.

SUMMARY OF THE INVENTION

Techniques are provided herein to efficiently determine whether or not a new query may be answered by a query stored in a cache. These techniques improve query caching performance by efficiently selecting cached queries for evaluation and increasing the cache hit rate by allowing for inexact matches.

An embodiment of the invention provides a computer program product operative to support query caching. This product includes codes for determining a list of candidate queries stored in a cache that potentially could be used to answer a new query and codes for evaluating each of at least one candidate query in the list to determine whether or not there is a cache hit for the candidate query. The cache hit would indicate that the candidate query could be used to answer the new query. The evaluation is performed using a set of rules that allows for inexact matches of aggregates, if any, included in the new query. A query plan may thereafter be generated for the new query based on a specific candidate query with a cache hit The list of candidate queries to evaluate may include (1) all queries stored in the cache, (2) cached queries containing exact matches for items in a select list of the new query, or (3) cached queries containing exact and/or inexact matches for the select list items of the new query. Exact matches of select list items may be determined using a select list index, and inexact matches may be determined for aggregates using "aggregate rewrite", which may be performed using an aggregate index and the select list index, as described in further detail below. Only certain types of aggregates may be rewritten and, in an embodiment, a rewrite may be performed for an aggregate only if an exact match is not found for that aggregate.

The list of candidate queries to evaluate may thus be determined by (1) for each select list item of the new query with an exact match, obtaining a set of cached queries that include that select list item, (2) for each select list item of the new query without an exact match, obtaining a set of cached queries for that select list item using aggregate rewrite, and (3) forming the list of candidate queries by intersecting the sets of cached queries obtained for all select list items of the new query. Step (2) above may be performed by (1) obtaining a set of aggregates included in the cached queries which could be used to rewrite an aggregate in the new query without an exact match, (2) for each aggregate in this set, obtaining a set of cached queries that include that aggregate, and (3) performing a union of the sets of cached queries obtained for all aggregates in the set. Details for this are described below.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIG. 5 is a diagram illustrating an aggregate index used to rewrite distributive aggregates in a new query;

DESCRIPTION OF THE SPECIFIC EMBODIMENTS

Figure 1:
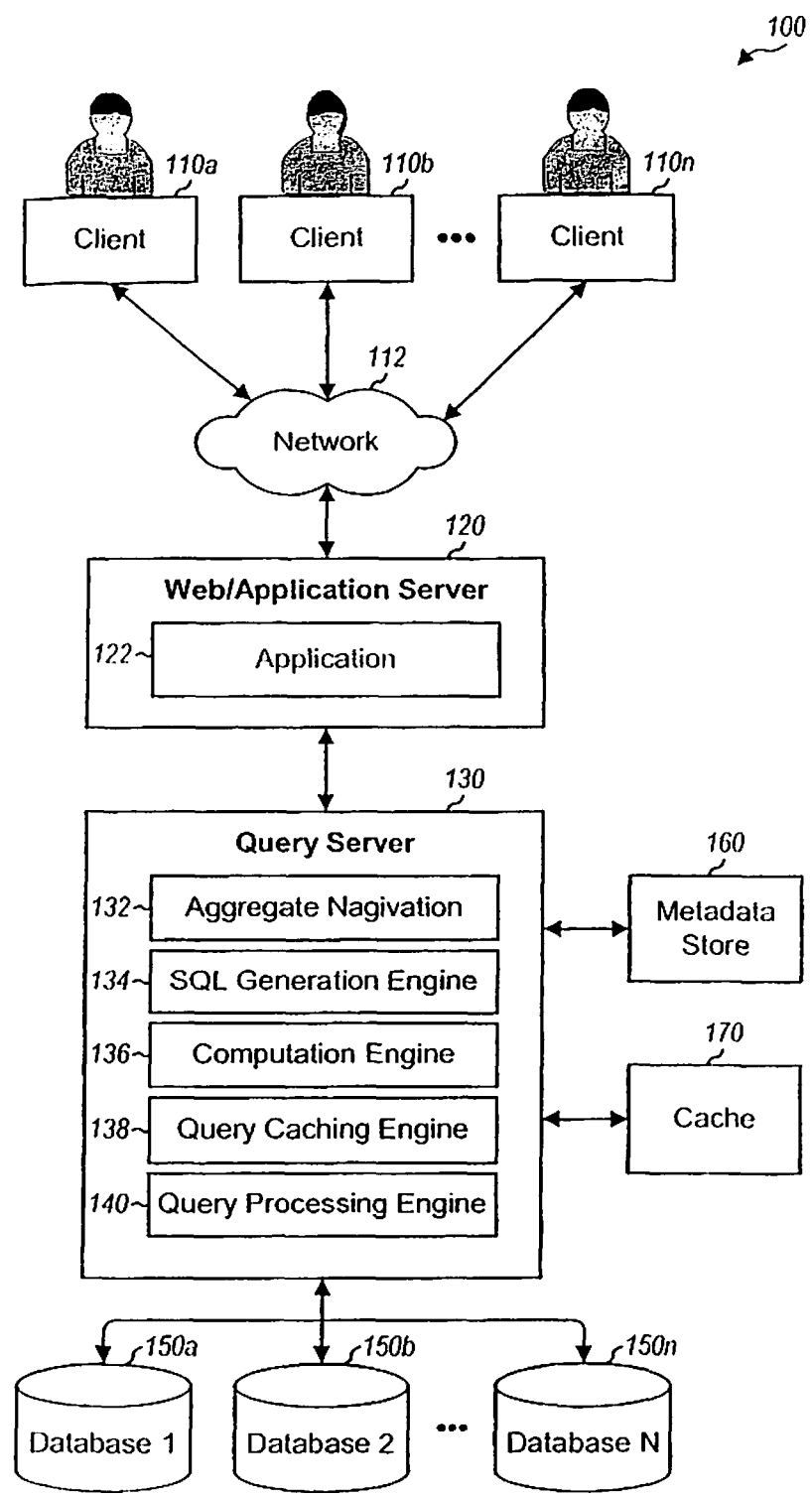
FIG. 1 is a diagram of an embodiment of a system wherein various aspects and embodiments of the invention may be implemented.

FIG. 1 is a diagram of a system 100 wherein various aspects and embodiments of the invention may be implemented. A Web/application server 120 provides support for a number of end-users, each of whom may access this server via a respective client machine 110, which may be a computer system, a terminal, or some other device. The client machines couple to the Web/application server via a communication network 112, which may be a computer network such as the Internet, a wireline connection, a wireless connection, or some other connection.

Depending on its design, Web/application server 120 may support various software applications (e.g., analytics), with only one application 122 being shown in FIG. 1 for simplicity. Web/application server 120 receives requests from the end-users via client machines 110, processes each user request by interacting with a query server 130, and provides the results for the requests to the end-users.

Query server 130 receives logical query requests (or queries) from Web/application server 120, processes each query, and provides the results for the queries back to the Web/application server. Query server 130 performs all of the query processing, including sending SQL requests to the databases. In the embodiment shown in FIG. 1, server 130 includes a number of modules/engines. An aggregate navigation module 132 determines whether or not new queries can be answered using precomputed results, which can speed up the query processing. A computation engine 136 performs processing for various functions such as join, sort, calculate, filter, and so on. A query caching engine 138 performs caching for queries such that data can be accessed and processed in an efficient manner. A query processing engine 140 translates logical requests of the new queries into physical queries against one or more databases.

Databases 150 store data that may be accessed by server 130 as needed. A metadata store 160 stores information about the application environment, data modeling, aggregate navigation, caching, and so on. This information is used by server 130 to perform various processing. A cache 170 provides storage for results for prior queries and is implemented with a storage unit (e.g., a disk drive or a memory unit) that can be accessed more readily and quickly than databases 150.

FIG. 1 shows an example architecture for a system that can support query caching. Other architectures may also be used and are within the scope of the invention. Web/application server 120 and query server 130 may be implemented on the same or different computer systems.

The processing for a new query may proceed as follows. The query is first provided to SQL generation engine 134, which translates the logical request for this query into an SQL statement. Query processing engine 140 then determines whether or not this query may be answered using a query that is stored in cache 170. If the answer is yes, then the query request is run against the cached query. Otherwise, query processing engine 140 translates the SQL statement into physical queries against one or more databases 150. In either case, computation engine 136 performs post processing of the intermediate results from the databases or the cache to provide the desired results.

A logical request may be issued by an end-user or some other entity to query objects in one or more databases to obtain specific results of interest. The logical request may be formulated using a SELECT statement, which is the basis for querying a structured query language (SQL) database. The SELECT statement for a query, which is also referred to as a query specification, has the following basic syntax:

```
SELECT [DISTINCT] select_list
FROM from_clause
[WHERE search_condition]
[GROUP BY column {, column}
    [HAVING search_condition]]
[ORDER BY column {, column}]
``` where select_list is a list of "items" to be provided as results for the query;

from_clause is a list of tables containing data being accessed by the query, and may optionally include certain join information for the query;

search_condition may specify any combination of conditions or restrictions to form a conditional test; and column is a column (or alias) belonging to a table defined in a database.

In the above syntax for the SELECT statement, "[ ]" and "{ }" each indicate zero or one instance or occurrence of the item within the bracket. Thus, the items within the "[ ]" and "{ }" brackets are optional.

Queries are normally run against one or more databases, each of which may include one or more tables. Each table is uniquely identified by a table name and typically includes a number of columns that contain the data for that table. Each column of a table is also uniquely identified by a column name. However, columns of different tables may have the same name, in which case they may be uniquely identified by the combination of table and column names (e.g., TableX.ColumnY).

A query may ask for data in "raw" form, such as the data in a column of a table. A query may also ask for data to be "aggregated" in some defined manner. For example, the query may ask for the sum of all revenues for each product. The level of aggregation may be specified in the query (e.g., sum of revenues for each product, for each product and in each year, for each year, and so on). Aggregates are described in further detail below.

As shown above, the SELECT statement for a query includes a number of clauses, some of which are optional. The FROM clause includes a list of tables from which the results of the query may be obtained.

The SELECT clause includes a list of one or more items to be provided as the results of the query. Each select list item may be (1) a column in a table identified by the FROM clause (e.g., "revenue"), (2) an aggregate, which is typically a particular operation or function to be performed on a specified column (e.g., "sum(revenue)"), or (3) an expression, which is an operation to be performed on each entry in one or more specified columns (e.g., "revenue+5"). One column is provided in a results table for the query for each item in the select list. Thus, the SELECT clause defines the format of the results table for the query.

The WHERE clause includes one or more conditions or restrictions used to limit the query results. Thus, only data that satisfies the specified conditions is included in the results table. The conditions in the WHERE clause may be viewed as filters for the data obtained by the SELECT clause.

The GROUP BY clause includes one or more columns by which aggregates, if any, in the SELECT clause are computed. The aggregation is performed such that one aggregated value is provided for each unique combination of the elements in the column(s) specified in the GROUP BY clause. For example, if the SELECT clause includes an aggregate "sum(revenue)" and the GROUP BY clause includes "product", then the sum of revenue is computed for each unique product. The level of aggregation is thus specified by the column(s) in the GROUP BY clause.

The HAVING clause includes one or more conditions or restrictions for aggregates. The conditions in the HAVING clause may be viewed as filters for the data obtained by aggregates in the SELECT clause.

The ORDER BY clause is used to arrange the order of the columns in the output table.

As an example, a SELECT statement for a first query may be written as follows:

```
select year, product, sum(revenue)
from time, products, facts
where year > 1997
group by year
```

The results of this query may be as follows:

| YEAR | PRODUCT | SUM(REVENUE) |
|------|---------|--------------|
| 1998 | Coke    | 1100         |
| 1998 | Pepsi   | 1100         |
| 1999 | Coke    | 1150         |
| 1999 | Pepsi   | 1150         |
| 2000 | Coke    | 1400         |
| 2000 | Pepsi   | 1400         |

This query includes one aggregate: "sum(revenue)", and the GROUP BY clause includes one column: "year". Thus, the values in the revenue column are summed for all products for each year.

In one specific SQL instantiation, if the GROUP BY clause is not included in the SELECT statement, then the level of aggregation is determined by the non-aggregate columns in the SELECT clause. For example, if the SELECT statement for the first query did not include the GROUP BY clause, then the level of aggregation would be product and year (i.e., the aggregation is performed for each product of each year).

The SELECT statement for a second query may be written as follows:

```
select year, product, sum(revenue)
from time, products, facts
where year > 1997
group by product, year
```

The results of this query may be as follows:

| YEAR | PRODUCT | SUM(REVENUE) |
|------|---------|--------------|
| 1998 | Coke    | 500          |
| 1998 | Pepsi   | 600          |
| 1999 | Coke    | 600          |
| 1999 | Pepsi   | 550          |
| 2000 | Coke    | 800          |
| 2000 | Pepsi   | 600          |

This query is the same as the first query and includes one aggregate: "sum(revenue)". However, the GROUP BY clause includes two columns: "product" and "year". Thus, the values in the revenue column are summed for each product of each year.

The SELECT statement for a third query may be written as follows:

```
select year, product, sum(revenue)
from time, products, facts
where year > 1997
group by product, year
having sum(revenue) > 800
```

This query is similar to the second query, except that only the results for the product/year combinations with the sum of revenue exceeding 800 are provided in the results table.

Different instantiations of SQL may support different features not present in the standard SQL. One specific "extended" SQL instantiation is described below having various capabilities not supported by standard SQL. This extended SQL has the ability to perform "functional" aggregates such as "rank", "median", "topn", "bottomn", and "running/moving aggregates". This extended SQL may further have the ability to, for "regular" aggregates such as "sum", output aggregates with multiple levels of aggregation in a single row of the results table. For example, the extended SQL would allow for the following items in the select list: "country", "region", "sum(sales by country, region)", and "sum(sales by country)". Standard SQL does not have the ability to support the previous select list. This extended SQL also allows users to place conditions in the WHERE and HAVING clauses interchangeably. The query compiler would then determine the appropriate place for each clause. In much of the following description, the extended SQL is assumed to be used and all conditions are deemed to be placed in the WHERE clause.

Extended SQL also supports another syntax in addition to the one used for standard SQL. For example, the SELECT statement for the first query described above may also be written as:
    select year, product, sum(revenue by year)
where the GROUP BY clause is effectively included in the aggregate.

Referring back to FIG. 1, the logical request generation translates the new query into a representation of this extended SQL. The physical query generated by query processing engine 140 would then be in standard SQL.

The above examples show the use of aggregates in queries. One fast way to process a query is to skip the bulk of the processing and use precomputed results. Aggregate tables are examples of such and contain precomputed results for a particular aggregation level. For example, an aggregate table may store sales results for each product by month, when the granularity of detail for the database may be at the day level. To create this aggregate table, a process (often a query) computes the results and then stores them in a table in the database.

As noted above, the processing of queries may require a long time and further consume large amounts of resources. Query caching may be used to store the results of prior queries in a cache so that these results may thereafter be used to obtain results for new queries. If a new query can be answered using the stored results (a cache hit), then the cost of evaluating this query is considerably cheaper than having to pose the query anew against one or more databases (a cache miss). The throughput and performance of the system would be determined by the cache hit rate.

A query caching system typically includes a number of components, two of which are cache hit detection and query plan generation. The cache hit detection component determines whether or not a given new query can be answered by any one of the cached queries. If there is a cache hit, then the query plan generation component generates a query plan for the new query in terms of a selected cached query with the cache hit. The query plan will then be processed to obtain the results for the new query based on the results for the selected cached query.

Cache Hit Detection

A major design tradeoff for a query caching system is the cost incurred for processing each new query to detect a cache hit versus the benefits of reduced response time and resources usage whenever a cached query is used to answer the new query. On one extreme, a cache hit detection scheme may require an exact match between a new query and a cached query to be declared a cache hit. An exact match would occur if the elements in each clause of the SELECT statements for the two queries are identical, including the WHERE clause conditions. To determine exact match, the expression tree for the SELECT statement for each cached query may be viewed as a key. An index structure populated with the keys for all cached queries may then be compared with the key for the new query to determine whether or not there is an exact match. Exact match is relatively simple to evaluate but is also the most restrictive, and cache misses may be erroneously declared in instances where cached queries may actually be used to answer the new query.

A cache hit detection scheme that can identify cache hits based on an inexact match between the new query and cached queries requires more processing but may be able to provide improved performance by increasing the cache hit rate. An inexact match cache hit may be determined by "evaluating" the new query against a cached query based on the semantics of queries. For a given query, the semantics specify both the operations to be performed for that query and the order for performing these operations to obtain the results. After evaluating the new query against the cached query, it may be possible to ascertain whether the results for the new query could be obtained from the results for the cached query.

The computational semantics for a query may be expressed as follows:
1) Evaluate the FROM clause to determine the data sources (perform any joins).
2) Retrieve the columns identified in the SELECT clause.
3) Filter the rows of the retrieved columns in accordance with the WHERE clause.
4) Divide the results of the filtering into groups specified in the GROUP BY clause (the GROUP BY clause may be implicit in the SELECT statement). This requires evaluation of grouping columns in the select list.
5) Process all aggregations in the select list (including "regular" aggregations and "functional" aggregations, which are described below).
6) Retain all groups from step 5 that satisfy the HAVING clause. (This also includes WHERE clause filters that reference a regular or functional aggregation.)
7) Remove duplicates if DISTINCT is specified in the SELECT clause.
8) Order the results from step 7 in a results table according to the ORDER BY clause.

Whether or not the new query can be answered by a given cached query may be ascertained by performing steps 1 through 7 described above for the new query and the cached query. As illustrated above, the processing to determine inexact match may be complicated.

The cache may be designed to store a large number of queries. In that case, another important design consideration is the selection of queries stored in the cache to evaluate against the new query to detect for cache hits. If the processing to evaluate a cached query for cache hit is simple, as is the case for exact match, then the new query may be evaluated against each cached query, one at a time, until a cache hit is declared. This is often referred to as the "naïve" strategy. However, if the processing to evaluate a cached query for cache hit is more complicated, as may be the case for inexact match, and if the number of queries stored in the cache is large, then the costs of traversing through all cached queries to search for a cache hit may be excessive.

Techniques are provided herein to efficiently determine whether or not a new query may be answered by a cached query. These techniques improve query caching performance by (1) selecting cached queries for evaluation in an efficient manner, and (2) increasing the cache hit rate by allowing for inexact matches. These techniques may be advantageously used in query caching systems that store a large number of queries in the cache.

Figure 2:
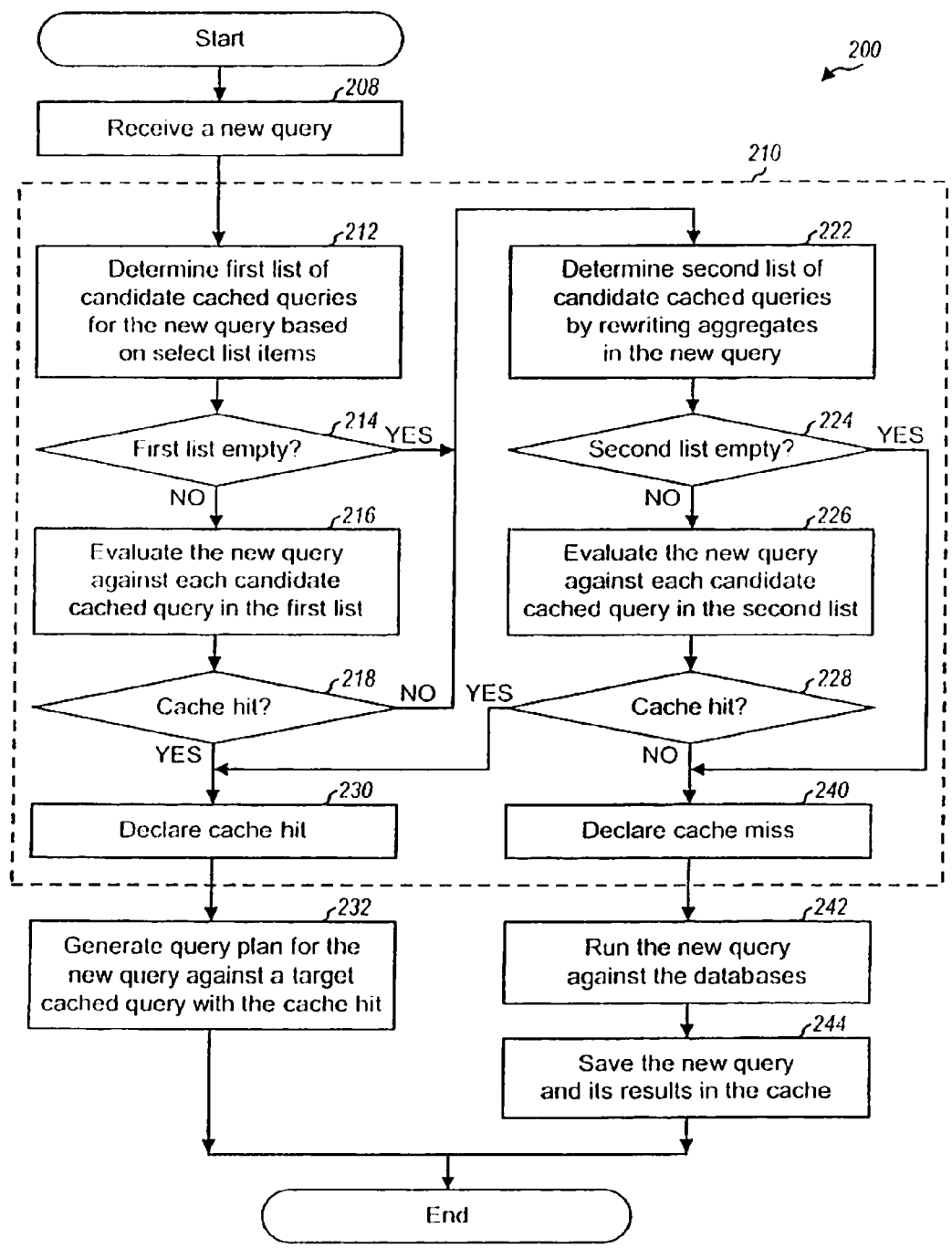
FIG. 2 is a flow diagram for processing a new query with query caching.

FIG. 2 is a flow diagram of an embodiment of a process 200 for processing a new query with query caching. Process 200 includes a set of steps 210 to detect for cache hit.

Initially, a new query is received for processing (step 208). A first list of "candidate" cached queries that potentially may be used to answer the new query is then determined based on items in the select list (step 212). If the cache stores a large number of cached queries, then a large amount of resources may be required to evaluate each cached query to determine whether or not there is a cache hit. Techniques are provided herein to efficiently "compare" the new query against the cached queries to trim down the number of candidate cached queries for evaluation. The first list may be determined as described in further detail below.

If the first list is not empty, as determined in step 214, then the new query is evaluated against each candidate cached query in the first list, one at a time, to determine whether or not the new query can be answered by the cached query (step 216). This evaluation may be performed as described in further detail below. If there is a cache hit for any cached query, as determined in step 218, then a cache hit is declared (step 230) and a query plan is generated for the new query based on the cached query with the cache hit (step 232). Multiple cache hits may be possible for the candidate cached queries in the first list. However, the evaluation in step 216 may stop after the first cache hit has been detected. The process then terminates.

If the first list is empty, as determined in step 214, or if no cache hit is achieved for any of the candidate cached queries in the first list, as determined in step 218, then a second list of candidate cached queries is determined by "rewriting" certain aggregates, if any, included in the new query (step 222). The new query may include one or more aggregates that may not be exactly like the ones in the cached queries. Techniques are provided herein to efficiently determine whether or not each aggregate in the new query may be answered by aggregates in the cached queries even if these aggregates are not exactly alike, as described in further detail below.

If the second list is not empty, as determined in step 224, then the new query is evaluated against each candidate cached query in the second list, one at a time, to determine whether or not the new query can be answered by the cached query (step 226). If there is a cache hit for any of the cached queries, as determined in step 228, then a cache hit is declared (step 230) and a query plan is generated for the new query based on a selected cached query with the cache hit (step 232). Otherwise, if the second list is empty, as determined in step 224, or if no cache hit is achieved for any of the candidate cached queries in the second list, as determined in step 228, then a cache miss is declared (step 240). In this case, the new query is run against the databases (step 242) and the new query and its results are stored in the cache for possible use by future queries (step 244). After steps 232 and 244, the process terminates.

As shown in FIG. 2, the cache hit detection may be viewed as a two-step process: (1) the formation of a list of candidate cached queries (steps 212 and 222) and (2) the evaluation of each candidate cached query in the list, one at a time, to determine whether there is a cache hit or miss (steps 216 and 226). The first step screens out the queries stored in the cache and eliminates the ones that cannot be used to answer the new query. This is desirable to trim down the number of cached queries to evaluate since the evaluation process may be extensive for inexact match. The second step performs the actual evaluation of each candidate cached query to determine whether or not there is a cache hit. Techniques are also provided herein to determine inexact match and to effectively deal with aggregates in queries.

As also shown in FIG. 2 and described in further detail below, two lists of candidate cached queries may be formed for the new query, one list at a time. The first list is typically easier to determine and is thus formed first. The second list requires more processing and is formed only if the first list does not result in a cache hit. The formation of these candidate lists is described in further detail below.

Numerous modifications may be made to the process shown in FIG. 2, and this is within the scope of the invention. For example, only steps 212 through 218 may be implemented to form and evaluate the first list of candidate cached queries, or only steps 222 through 228 may be implemented to form and evaluate the second list of candidate cached queries.

Candidate List formed by Select List Item Matching

In an aspect, the first list of candidate cached queries to evaluate for cache hit is determined based on items in the select list. As shown above, the SELECT clause for each query includes a list of one or more items, where each item may be column, an aggregate, or an expression. A cached query may be included in the first candidate list if each item in the select list of the new query has an exact match in the select list of the cached query.

Figure 3:
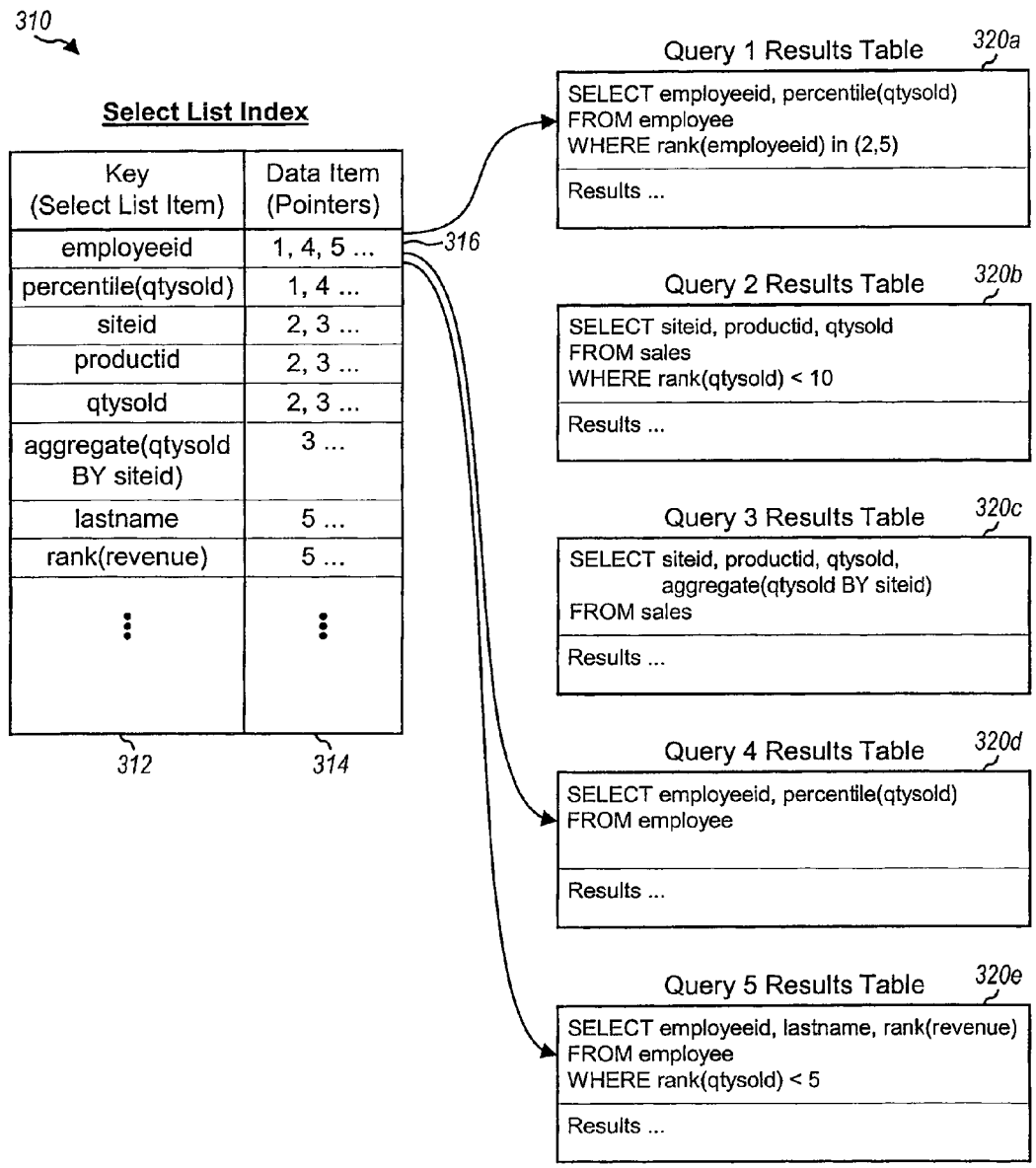
FIG. 3 is a diagram illustrating a select list index used to identify candidate cached queries based on select list items.

FIG. 3 is a diagram illustrating a data structure that may be used to identify candidate cached queries based on select list items. For this implementation, the results for each cached query is stored in a respective results table that is uniquely identified by a results table ID. Five results tables 320a through 320e are shown for five cached queries. The SELECT statement for each cached query is shown at the top of the results table for that query.

In the embodiment shown in FIG. 3, a select list index 310 includes two fields: a key (or select list item) field 312 and a data item (or pointers) field 314. Table 310 also includes one entry (akin to a row) 316 for each unique select list item for all queries stored in the cache. The eight unique select list items for the five cached queries are shown in FIG. 3. Since field 312 includes only unique select list items, the items in this field may be used as keys for looking up the select list index.

For each entry in the select list index, field 312 stores a specific select list item and field 314 stores a pointer to each results table whereby the associated query includes this select list item. For example, since "employeeid" is included in the SELECT clause of cached queries 1, 4, and 5, the data item for "employeeid" includes pointers to the results tables for queries 1, 4, and 5. Thus, each unique select list item is associated with a data item that is the set of cached queries containing that particular item.

In one embodiment, whole expressions are stored in the select list index. For this embodiment, an expression such as "productid+5" would be stored in its entirety in the table.

In another embodiment, subexpressions are stored in the select list index. Each expression may be decomposed into subexpressions, and each subexpression may then be stored in the select list index. For the above example, the expression "productid+5" can be decomposed into "productid" and 5, and "productid" may be stored in the table. "Productid" would then be deemed an inexact match for expressions such as "productid+5" and "productid*2" since these expressions may be computed from "productid" by the addition of 5 and the multiplication of 3, respectively.

If an expression includes multiple items stored in the select list index, the set of cached queries for this expression would be the intersection of the sets of cached queries for all items. For example, the set of cached queries for the expression "productid+siteid" would be the intersection of the set of cached queries containing "productid" and the set of cached queries containing "siteid", since both items are needed to compute "productid+siteid".

The select list index is updated as necessary to ensure that its contents remain accurate. In particular, whenever an existing query is deleted from the cache, the select list index is updated so that each select list item that references the deleted query is revised or removed from the table. Similarly, whenever a new query is stored in the cache, each select list item included in the new cached query is revised or added to the index.

The select list index in FIG. 3 represents one specific data structure that may be used for matching select list items. Other data structures may also be used and this is within the scope of the invention. For example, a table may be designed with one entry for each query stored in the cache. Each entry would then include all select list items for the associated entry. The select list item matching may then be performed by traversing this table and comparing the select list items for each cached query against the select list items for the new query.

Figure 4:
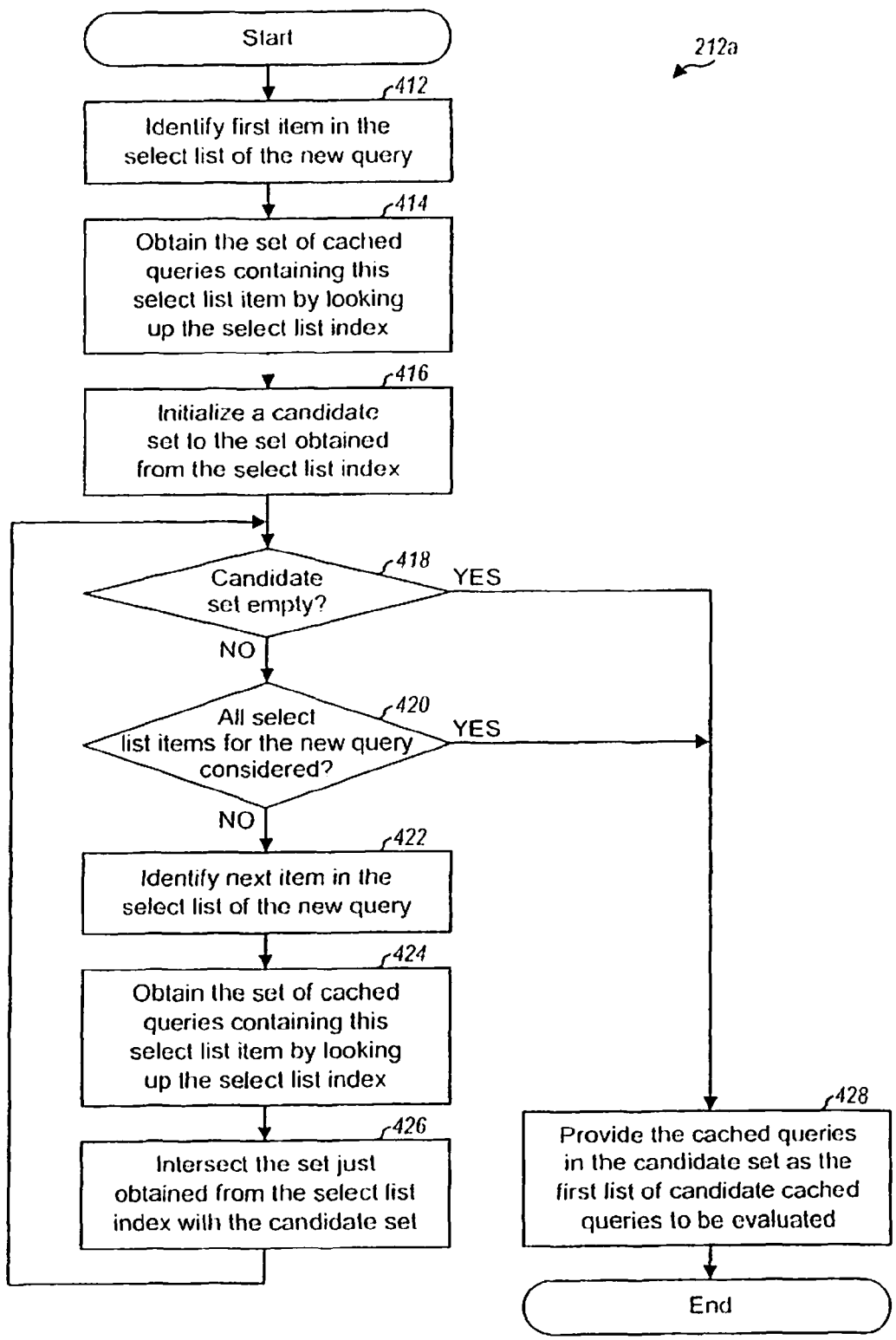
FIG. 4 is a flow diagram of a process for determining a list of candidate cached queries based on select list items.

FIG. 4 is a flow diagram of an embodiment of a process 212a for determining the first list of candidate cached queries based on select list items. Process 212a may be used for step 212 in FIG. 2 and operates in conjunction with the select list index shown in FIG. 3.

Initially, the first item in the select list of the new query is identified (step 412). The set of cached queries containing this select list item is then obtained by looking up the select list index (step 414). This can be achieved by looking up the key corresponding to this select list item and retrieving the data item associated with this key. A candidate set is then initialized to include all cached queries contained in the set just obtained from the select list index (step 416).

A determination is then made whether or not the candidate set is empty (step 418). If the answer is yes, then the process proceeds to step 428. This is because any additional select list item can only reduce the candidate set but never enlarge it, and an empty candidate set at any stage would indicate that there are no possible candidate cached queries for the new query.

If the candidate set is not empty, as determined in step 418, then a determination is made whether or not all select list items for the new query have been considered (step 420). If the answer is no, then the next item in the select list of the new query is identified (step 422), and the set of cached queries containing this select list item is obtained by looking up the select list index (step 424). The set of all cached queries that contains all select list items considered thus far may then be determined by intersecting the set just obtained from the select list index with the candidate set (step 426). The new candidate set would include only those cached queries, if any, that are present in both the prior candidate set and the set just obtained. The process then returns to step 418.

If the candidate set is empty, as determined in step 418, or if all select list items for the new query have been considered, as determined in step 420, then the cached queries included in the candidate set are provided as the first list of candidate cached queries to be evaluated (step 428). This first list may be a null list if no cached query contains all of the select list items included in the new query. The process then terminates.

The process shown in FIG. 4 can be illustrated with an example whereby the new query includes the following SELECT clause:

select employeeid, rank(revenue)

The select list for this query includes two items: "employeeid" and "rank(revenue)". Using the select list index shown in FIG. 3, the item "employeeid" is first identified in the table and the set of cached queries that contain this item is determined as {1, 4, 5}. The next item "rank(revenue)" is then identified in the table and the set of cached queries that include this item is determined as {5}. The intersection of the set {1, 4, 5} with the set {5} is {5}, which is provided as the first list of candidate cached queries for this new query.

In the above description, the first list of candidate cached queries is determined based on exact match of select list items. Items for other clauses in the SQL statement may also be stored in an index, in conjunction with or as substitute for the select list items, and this is within the scope of the invention. For example, if a sufficient number of tables or data sources are accessed, then these may also be stored in the index. For example, one entry may be provided in the index for each unique item in the FROM clause. The items in the FROM clause of the new query may then be processed in similar manner as that described above for the select list items.

Candidate List formed using Aggregate Rewrite

Queries often include aggregates. Each aggregate typically denotes a particular operation (e.g., sum) to be performed on a particular data column with a particular level of aggregation, all of which are specified in the SELECT statement for the query.

The set of all aggregates supported by a particular SQL instantiation may be classified into a number of different categories based on the properties of the resultant data generated by the aggregate operation or function. These categories include "regular" aggregates, "distributive" aggregates, and "functional" aggregates. Distributive aggregates include operations such as SUM, COUNT, MAX, and MIN. Regular aggregates are a superset of distributive aggregates (e.g., average is a regular aggregate that is not a distributive aggregate). Functional aggregates include operations such as RANK, PERCENTILE, TOPN, BOTTOMN, and MAVG. Of these categories, distributive aggregates are of special interest because the results of a distributive aggregate operation may be subjected to the same operation with a coarser level of aggregation and still produce the correct results.

For example, a cached query may contain the aggregate "sum(revenue by productid, year)", which sums revenue for each product and in each year. A new query may then ask for the aggregate "sum(revenue by year)", which sums revenue for each year. In this case, the results for the new query can be obtained from the results for the cached query by performing an additional aggregation over all products for each year. Similarly, if another query asks for the aggregate "sum(revenue by productid)", which sums revenue for each product, then the results for this query can be obtained from the results for the cached query by performing an additional aggregation over all years for each product. The aggregate "sum(revenue by year)" and "sum(revenue by productid)" in the two new queries may be rewritten in terms of the aggregate "sum(revenue by productid, year)" in the cached query.

The process of aggregating over a coarser level of aggregation is also referred to as "aggregate roll-up". Aggregate roll-up can be validly applied for certain aggregates, such as distributive aggregates, to produce the correct results. Aggregate roll-up would produce incorrect results if applied to some other aggregates. For example, the aggregate "avg (revenue by productid)" could not be obtained from the aggregate "avg(revenue by productid, year)" unless additional information regarding revenue is available.

Since distributive aggregates can be rolled up, they are good candidates for being rewritten if they appear in the new query. In one embodiment, using a naïve strategy, each distributive aggregate in the new query is checked against all aggregates in all cached queries for a possible rewrite. This embodiment can provide satisfactory performance when the number of cached queries is not too large. In another embodiment, the search for aggregates in the cached queries for a possible rewrite of a distributive aggregate in the new query is made using an aggregate index.

FIG. 5 is a diagram illustrating an embodiment of an aggregate index 510 that may be used to rewrite distributive aggregates in a new query. The aggregate index stores information for all distributive aggregates in the queries stored in the cache.

In the embodiment shown in FIG. 5, the aggregate index includes two fields: a key field 512 and a data item field 514. The key field includes all unique items being aggregated upon by aggregates in the select lists for the cached queries. For each unique item in the key field, the data item field includes the set of all select list aggregates that aggregated on that unique item. For the example shown in FIG. 5, the unique items being aggregated upon are "qtysold", "revenue", "units", "price", and so on. The unique item "qtysold" is aggregated upon by the aggregates "sum(qtysold)", "sum(qtysold by siteid)", "sum(qtysold by month)", and "max(qtysold)".

The aggregate index is updated as necessary to ensure that its contents remain accurate. In particular, whenever an existing query is deleted from the cache or a new query is stored to the cache, the aggregate index is updated so that aggregates, if any, included in the deleted or added query are deleted from or added to the index.

Figure 6A:
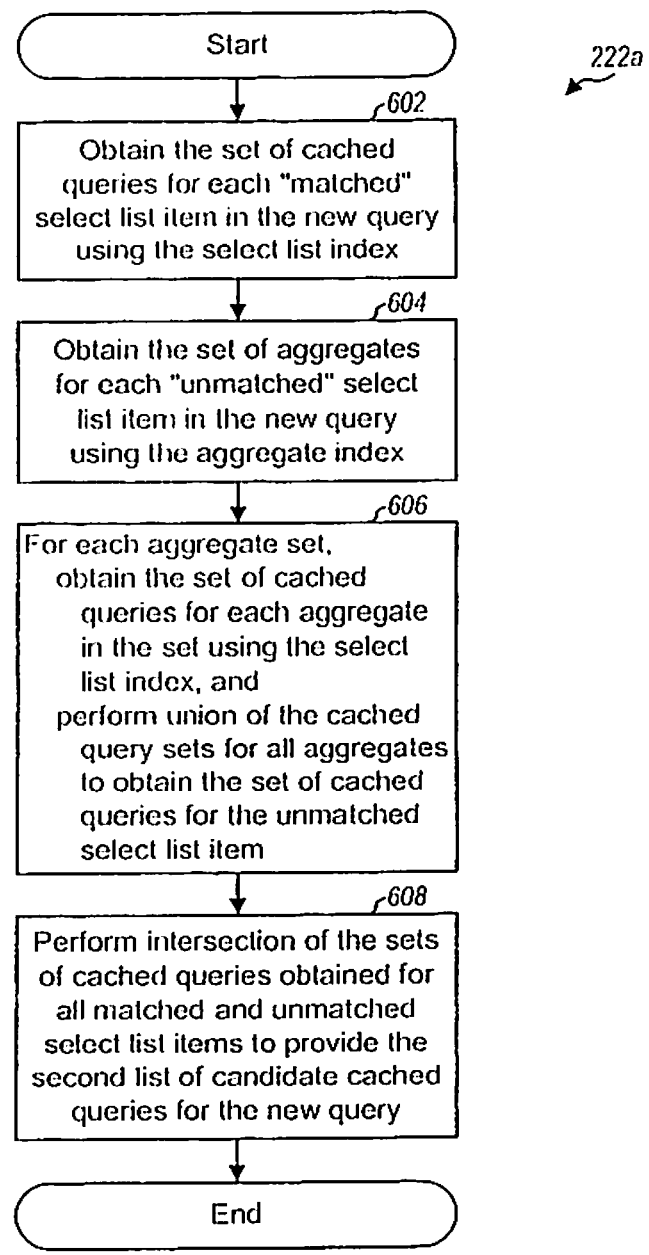
FIGS. 6A and 6B are flow diagrams of processes for determining a list of candidate cached queries using aggregate rewrite.

FIG. 6A is a flow diagram of an embodiment of a process 222a for determining candidate cached queries using aggregate rewrite for select list items without exact match in the select list index. Process 222a may be used for step 222 in FIG. 2. For this embodiment, the aggregate index is used in conjunction with the select list index to determine the second list of candidate cached queries for a new query.

In the first step of the process, the set of cached queries for each "matched" select list item in the new query is obtained using the select list index (step 602). A matched select list item is one that is found in the select list index, and an unmatched select list item is one that is not found in the index.

The set of aggregates is then obtained for each unmatched select list item in the new query using the aggregate index (step 604). The aggregate set for each unmatched select list item is further operated on to obtain the set of cached queries for the select list item. In particular, for each aggregate set, the set of cached queries for each aggregate in the set is first obtained using the select list index, and a union is then performed on the sets of cached queries for all aggregates in the set to obtain the set of cached queries for the unmatched select list item (step 606).

A set of cached queries is thus obtained for each matched select list item in step 602 and a set of cached queries is obtained for each unmatched select list item in steps 604 and 606. An intersection is then performed on all of these sets of cached queries to provide the second list of candidate cached queries for the new query (step 608).

Aggregate rewrite can increase the search space of candidate cached queries. In an embodiment, to prevent a possible explosion in the size of the search space, a rewrite is attempted for an aggregate (e.g., "aggregate(qtysold by siteid)") only if an exact match for the aggregate cannot be found in the select list index. Moreover, the increase in the search space may be minimized by choosing a specific order in which to process the items in the select list of the new query. Since only aggregates are candidates for rewrites and since rewrites can increase search space, they may be processed last.

Figure 6B:
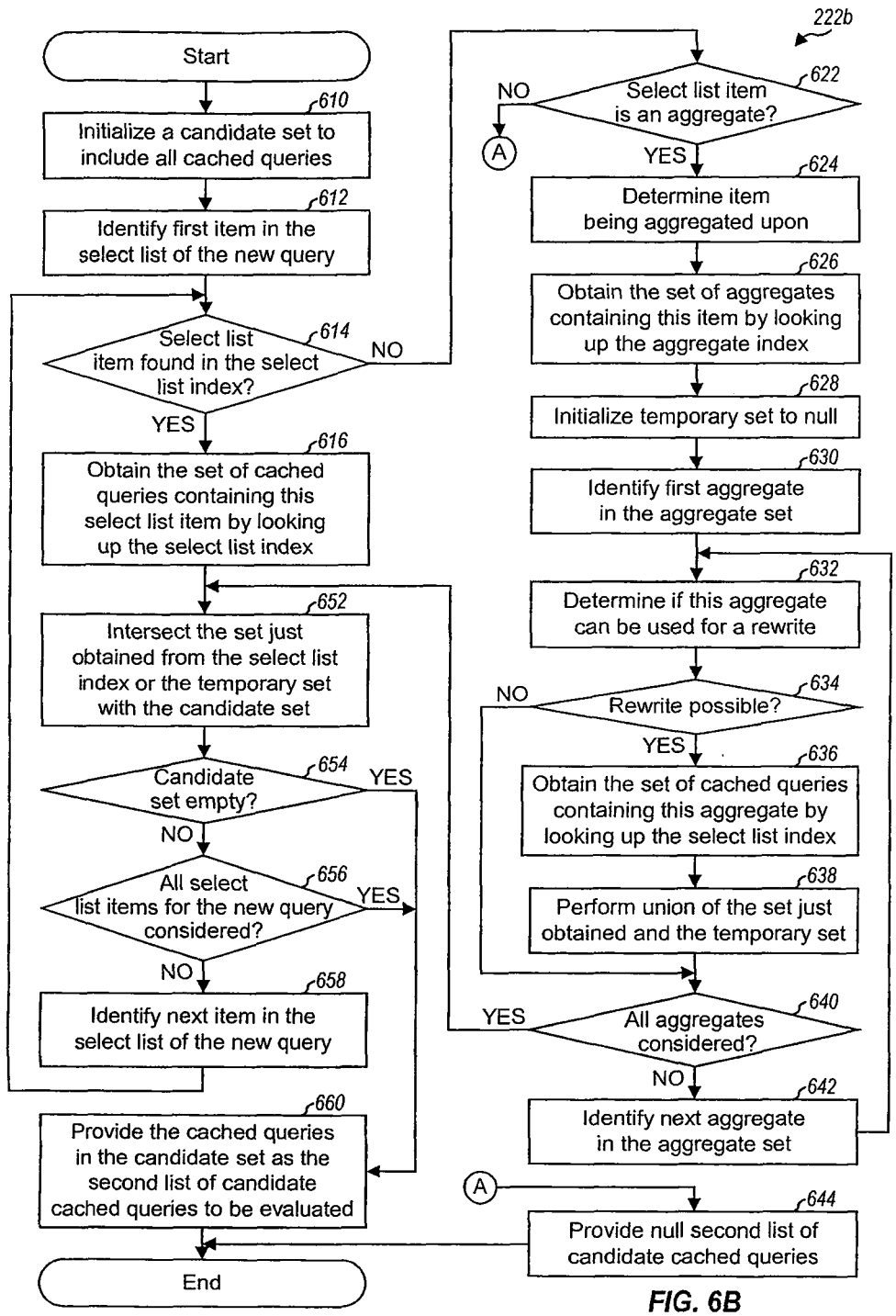

FIG. 6B is a flow diagram of another embodiment of a process 222b for determining the candidate cached queries based aggregate rewrite for unmatched select list items. Process 222b is a specific implementation of process 222a and may also be used for step 222 in FIG. 2. For simplicity, process 222b sequentially processes the select list items for the new query.

For process 222b, a candidate set is first initialized to include all queries stored in the cache (step 610). The first item in the select list of the new query is then identified (step 612). A determination is then made whether or not this select list item is found in the select list index (i.e., whether or not this is a match or unmatched select list item) (step 614). If the select list item is found in the select list index, then the set of cached queries containing this select list item is obtained by looking up the select list index (step 616).

Otherwise, if the select list item is not found in the select list index, then a determination is made whether or not the item is an aggregate (step 622). If the answer is no, then the select list item is deemed to not be included in any of the cached queries, and the process proceeds to step 644 where a null second list is provided for the new query. Otherwise, if the select list item is an aggregate, then the item being aggregated upon is determined (step 624). The set of aggregates in the cached queries that contain or aggregated over this item is then obtained by looking up the aggregate index (step 626).

A temporary set is next initialized to null (step 628). The first aggregate in the aggregate set is then identified for consideration (step 630) and this aggregate is evaluated to see whether or not it can be used for a rewrite of the select list aggregate in the new query currently being processed (step 632). A rewrite would be possible if the select list aggregate merely roll ups the results of the aggregate under consideration. As part of the rewrite evaluation, a check is performed to ensure that all columns identified in the select list aggregate are included in the select list of the cached query. For example, if "aggregate(qtysold by siteid)" is to be rewritten using "aggregate(qtysold by siteid, productid)", then the item "productid" needs to be present in the select list of the cached query.

If a rewrite is not possible, as determined in step 634, then the process proceeds to step 640. Otherwise, if a rewrite is possible, then the set of cached queries containing the aggregate under consideration is obtained by looking up the select list index (step 636), and a union is performed between this set of cached queries and the temporary set. The union is performed because any of the aggregates that can be used for a rewrite may thereafter be selected for the select list aggregate.

A determination is then made whether or not all aggregates in the aggregate set have been considered (step 640). If the answer is no, then the next aggregate in the set is identified (step 642), and the process returns to step 632 to evaluate this aggregate. Otherwise, if all aggregates in the set have been considered, then the process proceeds to step 652.

A set of cached queries is obtained for each match select list item in step 616 and a set of cached queries (which is the temporary set) is obtained for each unmatched select list item in steps 622 through 642. An intersection is then performed between the set of cached queries obtained for the select list item currently being processed and the candidate set (step 652).

If the candidate set is not empty (as determined in step 654) and if all select list items for the new query have not been considered (as determined in step 656), then the next item in the select list of the new query is identified (step 658), and the process returns to step 614 to process this select list item. Otherwise, if the candidate set is empty or if all select list items for the new query have been considered, then the cached queries included in the candidate set are provided as the second list of candidate cached queries for the new query (step 660). This second list may be a null list if no cached query contains all of the select list items (or rewrite candidates) included in the new query. The process then terminates.

In an embodiment, aggregate rewrites may also be performed on subexpressions. For example, consider the expression "sum(revenue by country)*2". This expression may be decomposed into "sum(revenue by country)" and 2. The subexpression "sum(revenue by country)" may then be written in terms of the aggregate "sum(revenue by country, year)".

The operation of processes shown in FIGS. 6A and 6B can be illustrated with an example whereby the new query includes the following SELECT clause:

select siteid, sum(revenue by siteid)

The select list for this query includes two items: "siteid" and "sum(revenue by siteid)". The first select list item "siteid" is used to index the select list index and, for the example index shown in FIG. 3, the set of cached queries that contain this item is {2, 3}. The next select list item "sum(revenue by siteid)", which is an aggregate, is then used to look up the select list index. If this aggregate appears in the select list index, then the set of cached queries for this aggregate is obtained from the index and processed in the manner described above for FIG. 4. However, if the aggregate does not appear in the select list index, then the aggregate index is used to determine possible rewrites for this aggregate.

Using the example aggregate index shown in FIG. 5, it is determined that there are three different aggregates in the cached queries that aggregated by "revenue", which are "sum(revenue by siteid, productid)", "sum(revenue by siteid, month)", and "sum(revenue by productid)". Each of these three aggregates is then examined to see if it can be used for aggregate rewrite. The first two aggregates can be used for rewrite because the level of aggregation for these aggregates is finer than that of the select list aggregate. However, the third aggregate "sum(revenue by productid)" cannot be used for rewrite because the aggregation is performed over a different grouping (i.e., "productid" instead of "siteid").

The select list index is then accessed to obtain (1) the set of cached queries containing the first aggregate in the set "sum(revenue by siteid, productid)", which may be, for example, {1, 2, 7}, and (2) the set of cached queries containing the second aggregate in the set "sum(revenue by siteid, month)", which may be, for example, {3, 9}. The union of these two sets would be {1, 2, 3, 7, 9}, which is the set of cached queries that support the second select list item "sum(revenue by siteid)" in the new query.

The set obtained for the first select list item {2, 3} is then intersected with the set obtained for the second select list item {1, 2, 3, 7, 9} to provide the second list of candidate cached queries {2, 3} that supports all select list items of the new query.

The aggregate index shown in FIG. 5 represents one specific data structure that may be used for rewriting aggregates in the new query. Other data structures may also be used and this is within the scope of the invention. For example, an index may be designed with one entry for each unique aggregate in the queries stored in the cache. Each entry would then include pointers to the cached queries that contain that aggregate. The aggregate rewriting may then be performed by traversing this index and evaluating each unique aggregate stored in the index against the aggregate in the new query. The evaluation may be performed by a two-step process, where the first step is to check whether or not the item being aggregated matches and the second step is to evaluate whether or not a rewrite is possible.

Evaluation of Candidate Cached Query with Exact Match for Select List Items

The candidate selection process described above ensures compatibility between the select list of the new query and the select list of each candidate cached query. However, each query may specify one or more filters via the WHERE and HAVING clauses. These filters limit the results provided for the query based on the conditions or restrictions specified by the filters. Thus, each candidate cached query would need to be evaluated to ensure that the filters, if any, specified by the cached query did not filter out any data needed by the new query. This evaluation is then to verify that the filters present in the new and cached queries are compatible.

For standard SQL, the WHERE clauses cannot contain aggregates. In some other SQL instantiations, such as the extended SQL described above, aggregates may be allowed in the WHERE and HAVING clauses, in which case the evaluation would need to account for any aggregates that may appear in these clauses. The server can be designed to automatically determine where each predicate should be placed. In the following analysis, an assumption is made that all filters are present in the WHERE clause prior to being appropriately placed.

Filters are often defined using "WHERE clause conjuncts", which can be described as follows. Consider an SQL query:

| | |
|---|---|
| SELECT | lastname, firstname |
| FROM | employees |
| WHERE | gender = "male" AND age > 50 |

This query asks for the lastname and firstname of all male employees with age greater than 50. In this query, "gender="Male"" and "age>50" are WHERE clause conjuncts. They are referred to as conjuncts because both conditions have to be satisfied for an employee's name to satisfy this WHERE clause condition. This is because the two conditions are joined with the AND operator. If these conditions had been joined with the OR operator, then they would be referred to as "WHERE clause disjuncts". Any logical expression can be normalized so that it consists of a sequence of conjuncts. The following description assumes that logical expressions are normalized before they are processed.

Figure 7:
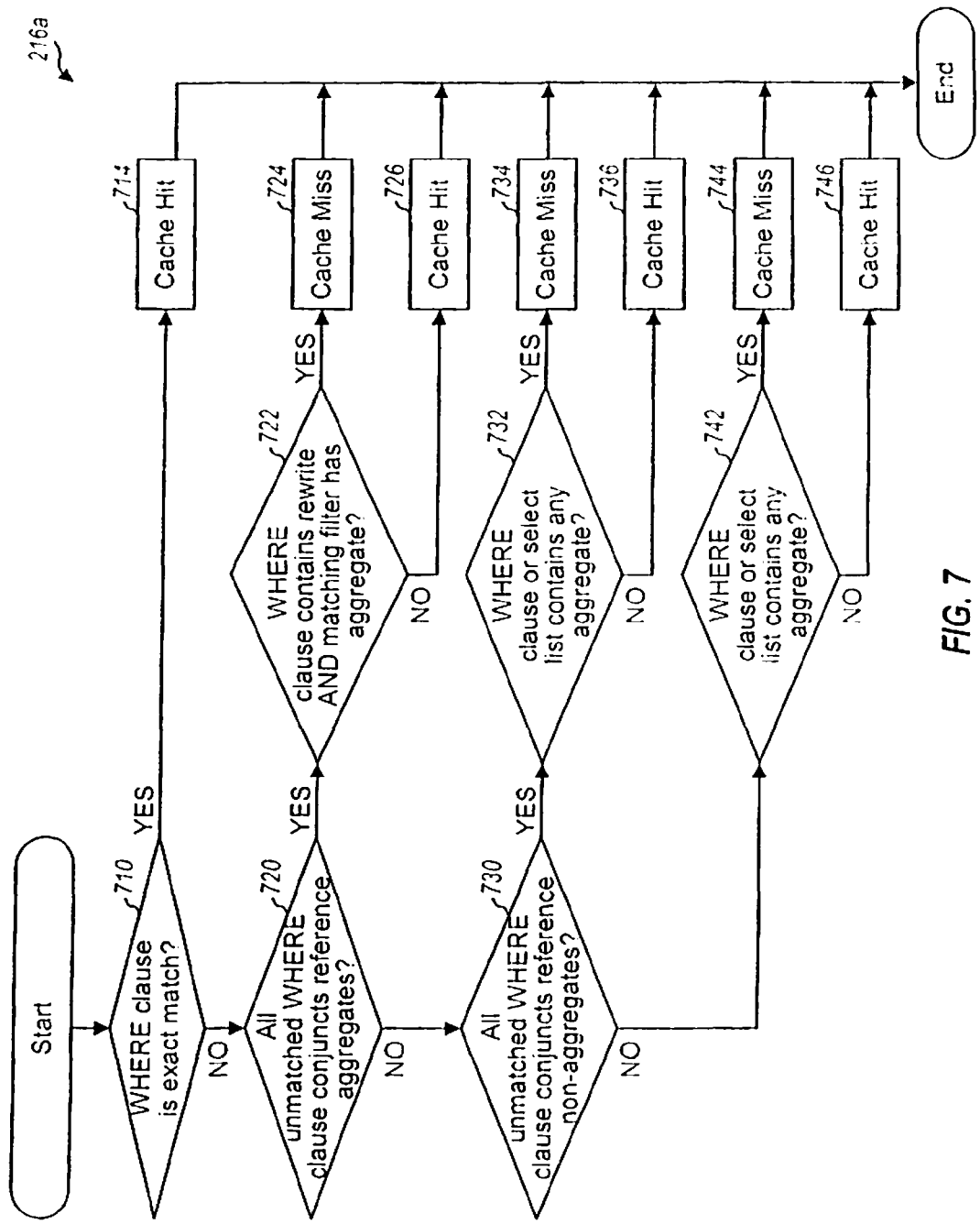
FIG. 7 is a flow diagram of a process for determining if there is a cache hit between a new query and a cached query with exact matches for their select list items.

FIG. 7 is a flow diagram of an embodiment of a process 216a for determining whether or not a particular candidate cached query can be used to answer the new query for the case in which each select list item for the new query has an exact match in this cached query. Process 216a may be used for step 216 in FIG. 2 and is performed for each candidate cached query in the first list. For simplicity, the candidate cached query being evaluated is referred to as the target query.

Initially, a determination is made whether or not the WHERE clause for the new query exactly matches that of the target query (step 710). If the answer is yes, which is the simplest case, then there is a cache hit (step 714).

Otherwise, if the WHERE clauses do not exactly match, then a determination is made whether or not all non-matching WHERE clause conjuncts reference aggregates (step 720). A WHERE clause conjunct is said to reference an aggregate if the aggregate is used in the WHERE clause conjunct (e.g., "sum(revenue by productid)>1000"). Step 720 effectively determines if there is a HAVING clause constraint. If the answer is yes, then a determination is made whether or not the WHERE clause contains rewrite AND the matching filter has aggregate (step 722). There is a cache miss if the answer is yes (step 724) and a cache hit if the answer is no (step 726).

If the answer to step 720 is no, then a determination is made whether or not all non-matching WHERE clause conjuncts reference non-aggregates (step 730). Step 730 effectively determines if there is a WHERE clause constraint. If the answer is yes, then a determination is made whether the select list or the WHERE clause contains any aggregate (step 732). There is a cache miss if the answer is yes (step 734) and a cache hit if the answer is no (step 736).

If the answer to step 730 is no, then a determination is made whether the select list or the WHERE clause contains any aggregate (step 742). There is a cache miss if the answer is yes (step 744) and a cache hit if the answer is no (step 746). The process then terminates.

The algorithm shown in FIG. 7 includes a specific set of criteria to check to determine whether or not the new query can be answered with the results from the target query (i.e., there is a cache hit). Different and/or additional criteria may also be included in the algorithm, and this is within the scope of the invention.

For clarity, specific examples are provided in Appendix A to illustrate the criteria described above in FIG. 7.

Figure 8A:
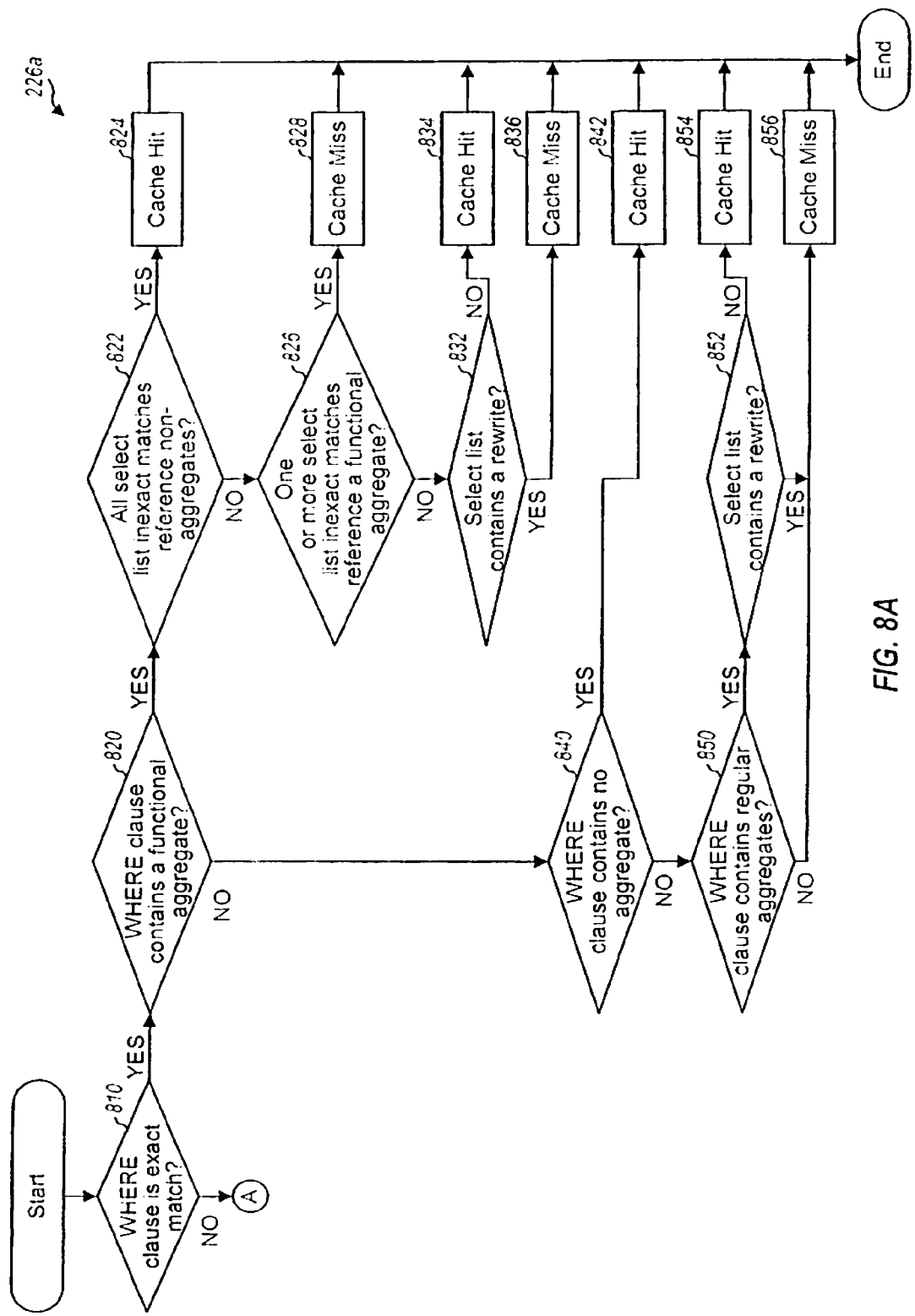
FIGS. 8A through 8C show a flow diagram of a process for determining if there is a cache hit between a new query and a cached query with one or more inexact matches for their select list items.
Figure 8B:
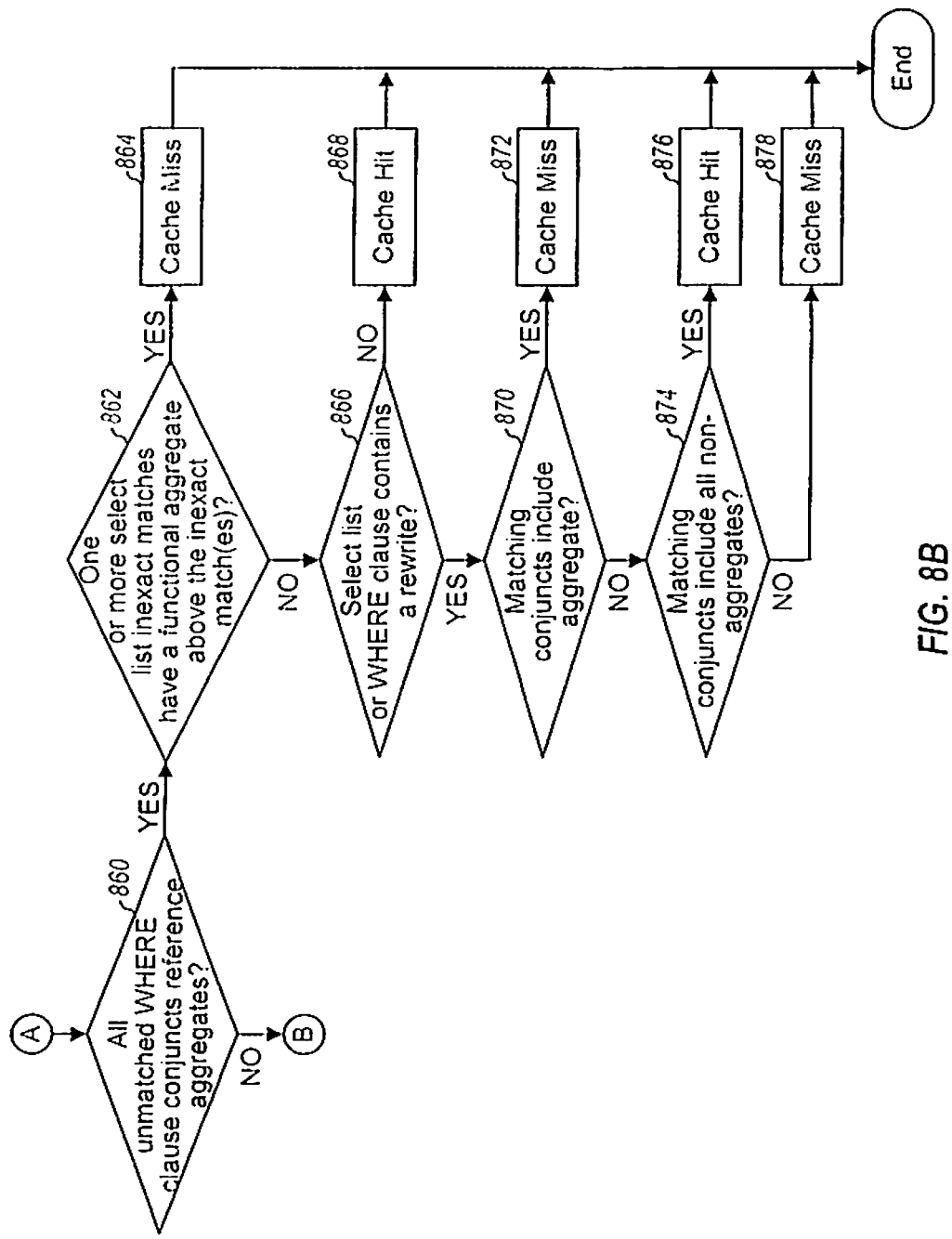
Figure 8C:
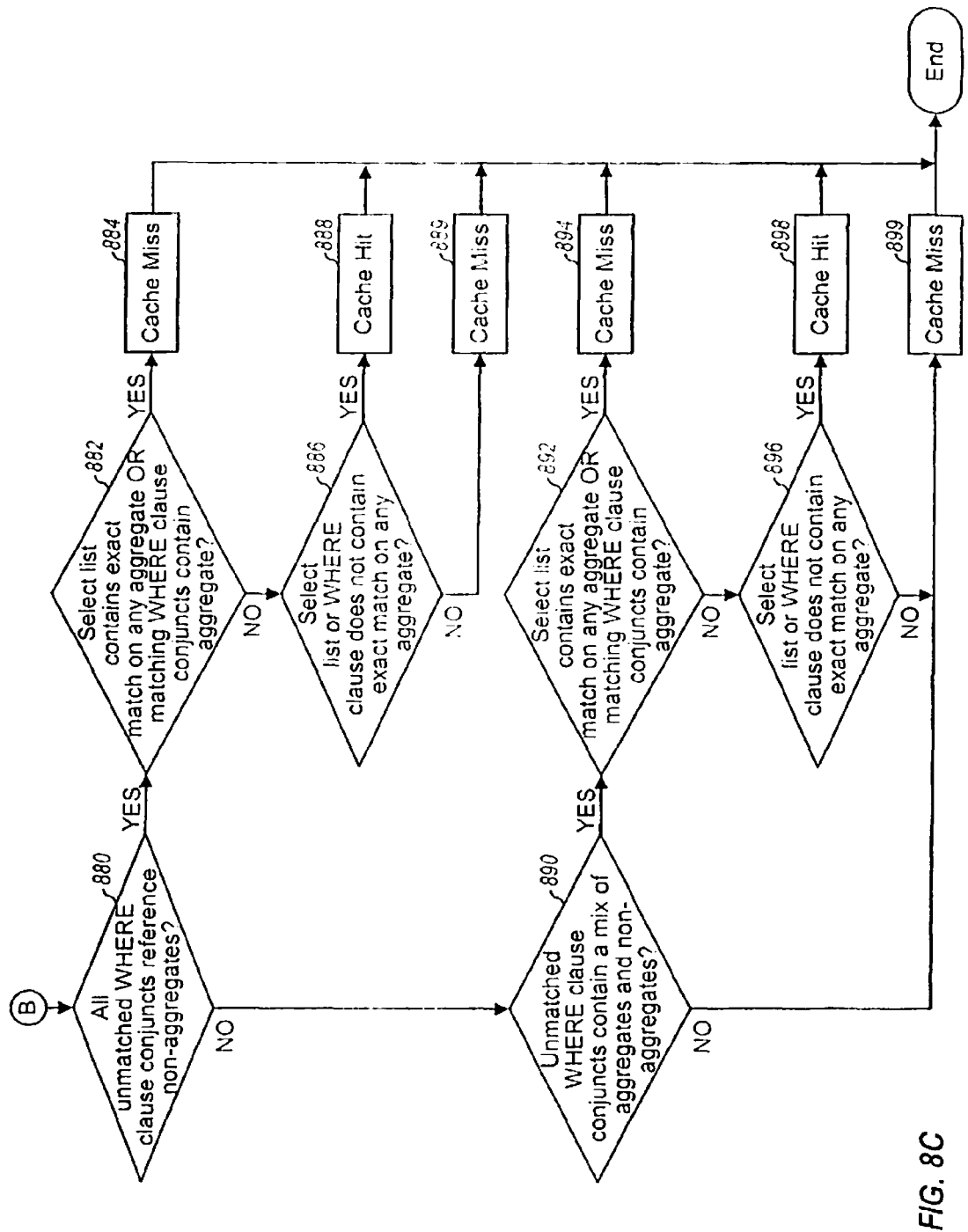

FIGS. 8A through 8C show a flow diagram of an embodiment of a process 226a for evaluating whether or not a particular candidate cached query can be used to answer the new query when the select list contains one or more inexact matches (or rewrites). Process 226a may be used for step 226 in FIG. 2 and is performed for each candidate cached query in the second list.

Initially, a determination is made whether or not the WHERE clause for the new query exactly matches that of the target query (step 810). If the answer is yes, then a determination is made whether or not the WHERE clause contains a functional aggregate (step 820). If the answer is also yes, then the following three criteria apply. First, there is a cache hit if all inexact matches in the select list reference non-aggregates (steps 822 and 824). Second, there is a cache miss if one or more inexact matches in the select list reference a functional aggregate where this aggregate is "above" the hit (i.e., the functional aggregate is computed from the cached rows) (steps 826 and 828). Third, there is a cache hit if the select list does not contain a rewrite (steps 832 and 834) and a cache miss otherwise.

If the answer to step 820 is no, then a determination is made whether or not the WHERE clause contains no aggregates (step 840). There is a cache hit if the answer is yes (step 842). If the answer to step 840 is no, then a determination is made whether or not the WHERE clause contains regular aggregates (step 850). If the answer is yes, then there is a cache hit if the select list does not contain an aggregate rewrite (steps 852 and 854) and a cache miss otherwise (step 856).

In FIG. 8B, if the WHERE clause is an inexact match, as determined in step 810, then a determination is made whether or not all non-matching WHERE clause conjuncts reference aggregates (step 860). If the answer is yes, then the following four criteria apply. First, there is a cache miss if one or more inexact matches in the select list have a functional aggregate above the inexact match(es) (steps 862 and 864). Second, there is a cache hit if the select list and the WHERE clause both do not contain a rewrite (steps 866 and 868). Third, there is a cache miss if the select list or WHERE clause contains a rewrite and the matching conjuncts include aggregate (steps 866, 870, and 872). Fourth, there is a cache hit if the select list or WHERE clause contains a rewrite and the matching conjuncts include only non-aggregate (steps 866, 870, 874, and 876).

In FIG. 8C, if the answer to step 860 is no, then a determination is made whether or not all non-matching WHERE clause conjuncts reference non-aggregates (step 880). If the answer is yes, then the following two criteria apply. First, there is a cache miss if the select list contains exact match on any aggregate or the matching WHERE clause conjuncts contain aggregate (steps 882 and 884). Second, there is a cache hit if the select list or WHERE clause does not contain exact match on any aggregate (step 888).

If the answer to step 880 is no, then a determination is made whether or not the non-matching WHERE clause conjuncts contain a mix of aggregates and non-aggregates (step 890). If the answer is yes, then the same two criteria for step 880 also apply, as shown in FIG. 8C.

The algorithm shown in FIGS. 8A through 8C includes a specific set of criteria to check to determine whether or not the new query can be answered by the target query when the select lists do not match exactly. Different and/or additional criteria may also be included in the algorithm, and this is within the scope of the invention.

For clarity, specific examples are provided in Appendix A to illustrate the criteria described above in FIGS. 8A through 8C.

Cached Query Selection

Given a new query (Q) and a set of cached queries (Q1, Q2 . . . QN), a determination needs to be made as to which specific cached query to use to generate the results for the new query. One or more cached queries may be hits and would be possibilities. Different amounts of processing may be required to be performed on the results for different cached queries to obtain the results for the new query. In one embodiment, the first candidate cached query that hits is selected for use to generate the results for the new query. In a second embodiment, some or all cached queries that hit may be further evaluated to determine the best one to use. The first embodiment may be used if the benefit from using the best cached query is outweighed by the cost of determining the best one.

Query Plan Generation

Once a specific cached query has been selected for use to generate the results for the new query, the query plan generation phase is entered (step 232 in FIG. 2) and a query plan is generated to compute the new query from the selected cached query.

In the query plan generation, if an expression in the select list of the new query contains an aggregate and there is an exact match for this expression in the select list index, then the expression is treated as a column index and not as an aggregate by the query compiler. For example, the new query may contain the expression "rank(qtysold)+5" in the select list. If there is an exact match for this expression in the select list index, then the expression is rendered in the new plan as a column index of "rank(qtysold)+5" in the target query's select list (which may be 1, 2, 3, and or on).

A major issue in query plan generation is to ensure that the correct order of filter execution is preserved. In an embodiment, filter execution order is preserved by inserting additional levels of nesting and moving filters where appropriate. In one implementation, rewrite rules for an expanded summary filter examine predicates in the detail filter and move them to the summary filter if appropriate. A summary filter is one normally included in the HAVING clause in standard SQL, and a detail filter is one normally included in the WHERE clause in standard SQL. The rewrite rules also replace summary filter lists by converting them to detail filters in a newly added layer of nesting. In general, the query plan produced by the plan generation should be equivalent to a query plan produced without query caching.

Examples of Evaluation of Cached Queries for Cache Hit

A number of examples are provided in Appendix A to illustrate the evaluation performed in FIGS. 7 through 8C to determine if a new query "hits" a cached query when the filters of the new query can be rendered on the cached query. If the filters cannot be rendered, then a cache miss can be declared with confidence. However, even if the filters can be rendered, a cache hit is not totally assured.

Computer System

Figure 9:
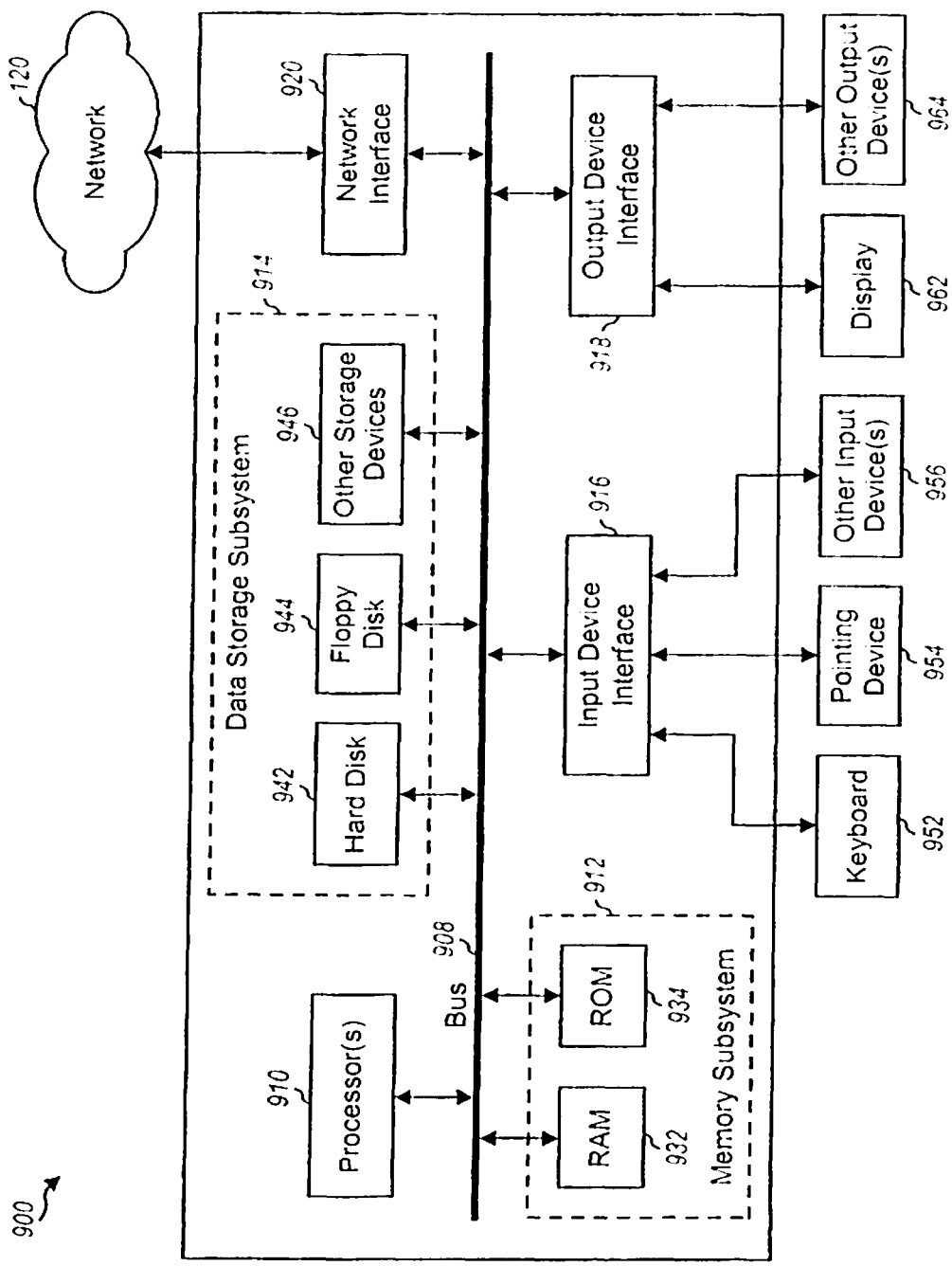
FIG. 9 is a block diagram of a computer system.

FIG. 9 is a block diagram of an embodiment of a computer system 900 that may be used to implement server 130 in FIG. 1. System 900 includes a bus 908 that interconnects major subsystems such as one or more processors 910, a memory subsystem 912, a data storage subsystem 914, an input device interface 916, an output device interface 918, and a network interface 920. Processor(s) 910 perform many of the processing functions for system 900 and communicate with a number of peripheral devices via bus 908.

Memory subsystem 912 may include a RAM 932 and a ROM 934 used to store codes and data that implement various aspects of the invention. For example, memory subsystem 912 may be used for metadata store 160 and possibly cache 170 in FIG. 1. Data storage subsystem 914 provides non-volatile storage for program codes and data, and may include a hard disk drive 942, a floppy disk drive 944, and other storage devices 946 (e.g., a CD-ROM drive, an optical drive, a removable media drive, and so on). Data storage subsystem 914 may be used to implement cache 170 in FIG. 1.

Input device interface 916 provides interface with various input devices such as a keyboard 952, a pointing device 954 (e.g., a mouse, a trackball, a touch pad, a graphics tablet, a scanner, or a touch screen), and other input device(s) 956. Output device interface 918 provides an interface with various output devices such as a display 962 (e.g., a CRT or an LCD) and other output device(s) 964. Network interface 920 provides an interface for system 900 to communicate with other computers coupled to network 112.

Many other devices or subsystems (not shown) may also be coupled to system 900. In addition, it is not necessary for all of the devices shown in FIG. 9 to be present to practice the invention. Furthermore, the devices and subsystems may be interconnected in configurations different from that shown in FIG. 9. The source codes to implement certain embodiments of the invention may be operatively disposed in memory subsystem 912 or stored on storage media such as a hard disk, a floppy disk, or a CD-ROM that is operative with a CD-ROM player.

Headings are included herein for reference and to aid in locating certain sections. These headings are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

Appendix A

Example 1

Cache query: SELECT employeeid, percentile(qtysold) FROM employee
    WHERE rank(employeeid) in (2,5).
New query: SELECT employeeid, percentile(qtysold) FROM employee
    WHERE rank(employeeid) in (2, 5)
Result: Cache hit. (Step 714 in FIG. 7) This is an exact match.

Example 2

Cache query: SELECT siteid, productid, qtysold FROM sales
    WHERE rank(qtysold)<10.
New query: SELECT siteid, productid, qtysold FROM sales
    WHERE rank(qtysold)<10 AND aggregate(qtysold BY siteid)>1000
Result: Cache miss. (Step 724 in FIG. 7)
    The aggregate in the WHERE clause is a rewrite.

Example 3

Cache query: SELECT siteid, productid, qtysold, aggregate (qtysold BY siteid)
    FROM sales
    WHERE rank(qtysold)<10.
New query: SELECT siteid, productid, qtysold, aggregate (qtysold BY siteid)
    FROM sales
    WHERE rank(qtysold)<10 AND aggregate(qtysold BY siteid)>1000
Result: Cache hit. (Step 726 in FIG. 7)

Example 4

Cache query: SELECT employeeid, percentile(qtysold) FROM employee.
New query: SELECT employeeid, percentile(qtysold) FROM employee
    WHERE rank(employeeid) in (2, 5)
Result: Cache hit. (Step 726 in FIG. 7) A cache hit is OK here because the constraint in the WHERE clause is equivalent to a constraint in a HAVING clause because it references a functional aggregate.

Example 5

Cache query: SELECT employeeid, lastname, rank(revenue) FROM employee
    WHERE rank(qtysold)<5.
New query: SELECT employeeid, lastname, rank(revenue) FROM employee
    WHERE rank(qtysold)<5 and rank(revenue)<4.
Result: Can be a cache hit. (Step 726 in FIG. 7) The cache hit is OK because the inexact part of the constraint is a fellow HAVING constraint.

Example 6

Cache query: SELECT revenue, qtysold, rank(revenue) FROM employee
    WHERE rank(revenue)<5.
New query: SELECT revenue, rank(revenue) FROM employee
    WHERE qtysold<1000.0 and rank(revenue)<5
Result: Can be a cache hit. (Step 726 in FIG. 7) There is the twist of normal aggregate versus functional aggregate.

Example 7

Cache query: SELECT employeeid, percentile(qtysold) FROM employee
New query: SELECT employeeid, percentile(qtysold) FROM employee
    WHERE employeeid in (2, 3, 5)
Result: Cache miss. (Step 734 in FIG. 7) The miss occurs because the "employeeid" constraint needs to be evaluated before the select list functional aggregate. It doesn't matter which functional aggregate is in the select list (e.g., could be "rank", "topn", and so on).

Example 8

Cache query: SELECT siteid, productid, qtysold, aggregate (qtysold BY siteid)
    FROM sales
    WHERE rank(qtysold)<10
New query: SELECT siteid, productid, qtysold, aggregate (qtysold BY siteid)
    FROM sales
    WHERE rank(qtysold)<10 AND productid<5
Result: Cache miss. (Step 734 in FIG. 7)

Example 9

Cache query: SELECT siteid, productid, qtysold FROM sales
    WHERE rank(qtysold)<10
New query: SELECT siteid, productid, qtysold, FROM sales
    WHERE rank(qtysold)<10 AND productid<5
Result: Cache miss. (Step 734 in FIG. 7)

Example 10

Cache query: SELECT employeeid, lastname FROM employee
New query: SELECT employeeid, lastname FROM employee
    WHERE lastname ='King'
Result: Cache hit. (Step 736 in FIG. 7)

Example 11

Cache query: SELECT lastname, qtysold FROM employee
New query: SELECT lastname, qtysold FROM employee
    WHERE lastname ='Smith'
Result: Can be a cache hit. (Step 736 in FIG. 7)

Example 12

Cache query: SELECT employeeid, qtysold, revenue FROM employee
    WHERE rank(qtysold)<10
New query: SELECT employeeid, qtysold, cast(employeeid as char(5))
    FROM employee
    WHERE rank(qtysold)<10
Result: Can be a cache hit. (Step 824 in FIG. 8A)

Example 13

Cache query: SELECT employeeid, qtysold, revenue FROM employee
 WHERE rank(qtysold)<10
New query: SELECT employeeid, qtysold, rank(revenue) FROM employee
 WHERE rank(qtysold)<10
Result: Cache miss. (Step 828 in FIG. 8A) In this case the WHERE clause is an exact match but the select list has an inexact match on a functional aggregate. Because the WHERE clause references a functional aggregate (and hence is a HAVING clause) and a functional aggregate is being computed from a cached column, this must be a miss otherwise the semantics would be a select list aggregate being computed after a HAVING clause.

Example 14

Cache query: SELECT revenue FROM employee
 WHERE rank(qtysold)<5
New query: SELECT revenue, percentile(revenue) FROM employee
 WHERE rank(qtysold)<5
Result: Cache miss. (Step 828 in FIG. 8A) The "percentile (revenue)" must be computed before the ranking is evaluated.

Example 15

Cache query: SELECT revenue FROM employee
 WHERE rank(revenue)<5
New query: SELECT revenue, rank(revenue) FROM employee
 WHERE rank(revenue)<5
Result: May be a cache hit. (Step 828 in FIG. 8A) This cache hit is quite subtle. It is only OK because the WHERE clause computes "rank(revenue)", which is what is being computed in the select list. If a different functional aggregate were used in the select list, then a cache miss would occur. The processes described above would provide a cache miss for this example.

Example 16

Cache query: SELECT siteid, productid, qtysold FROM sales
 WHERE rank(qtysold)<10
New query: SELECT siteid, productid, qtysold, aggregate (qtysold BY siteid)
 FROM sales
 WHERE rank(qtysold)<10
Result: Cache miss. (Step 836 in FIG. 8A)

Example 17

Cache query: SELECT siteid, productid, qtysold FROM sales
 WHERE rank(qtysold)<10
New query: SELECT siteid, productid, qtysold, log(qtysold) FROM sales
 WHERE rank(qtysold)<10
Result: Cache hit. (Step 834 in FIG. 8A)

Example 18

Cache query: SELECT employeeid, qtysold, revenue FROM employee
 WHERE employeeid<5
New query: SELECT employeeid, qtysold, cast(employeeid as char(5)), rank(qtysold) FROM employee
 WHERE employeeid<5
Result: May be a cache hit. (Step 842 in FIG. 8A)

Example 19

Cache query: SELECT siteid, productid, qtysold, aggregate (qtysold BY siteid)
 FROM sales
 WHERE aggregate(qtysold BY siteid)>1000
New query: SELECT siteid, productid, qtysold, aggregate (qtysold BY siteid), aggregate(qtysold BY) FROM sales
 WHERE aggregate(qtysold BY siteid)>1000
Result: Cache miss. (Step 856 in FIG. 8A)

Example 20

Cache query: SELECT siteid, productid, qtysold FROM sales
 WHERE aggregate(qtysold BY siteid)>1000
New query: SELECT siteid, productid, qtysold, log(qtysold) FROM sales
 WHERE aggregate(qtysold BY siteid)>1000
Result: Cache hit. (Step 854 in FIG. 8A)

Example 21

Cache query: SELECT revenue FROM employee
 WHERE rank(revenue)<5
New query: SELECT revenue, rank(revenue) FROM employee
 WHERE rank(revenue)<3
Result: Can be a cache hit. (Step 864 in FIG. 8B) It is nearly identical to the example above except has an inexact WHERE-clause. The processes described above would provide a cache miss for this.

Example 22

Cache query: SELECT revenue FROM employee
 WHERE rank(revenue)<5
New query: SELECT revenue, percentile(revenue) FROM employee
 WHERE rank(revenue)<3
Result: Cache miss. (Step 864 in FIG. 8B)

Example 23

Cache query: SELECT siteid, productid, qtysold FROM sales
 WHERE rank(qtysold)<10
New query: SELECT siteid, productid, qtysold, aggregate (qtysold BY siteid)
 FROM sales
 WHERE rank(qtysold)<10 AND aggregate(qtysold BY siteid)>1000
Result: Cache miss. (Step 872 in FIG. 8B)

Example 24

Cache query: SELECT siteid, productid, qtysold FROM sales
  WHERE productid<10
New query: SELECT siteid, productid, qtysold , aggregate (qtysold BY siteid)
  FROM sales
  WHERE productid<10 AND rank(qtysold)<20
Result: Cache hit. (Step 876 in FIG. 8B)

Example 25

Cache query: SELECT revenue FROM employee
  WHERE rank(revenue)<5
New query: SELECT log(revenue), revenue/1000.0, revenue FROM employee
  WHERE rank(revenue) in (1,3)
Result: Cache hit. (Step 868 in FIG. 8B)

Example 26

Cache query: SELECT employeeid, rank(qtysold), revenue FROM employee
  WHERE employeeid<5 and rank(revenue)<6
New query: SELECT employeeid, rank(qtysold), revenue FROM employee
  WHERE employeeid in (2,4) and rank(revenue)<6
Result: Cache miss. (Step 884 in FIG. 8C)

Example 27

Cache query: SELECT employeeid, rank(qtysold), revenue FROM employee
  WHERE employeeid<5 and rank(revenue)<6
New query: SELECT employeeid, rank(qtysold), percentile (revenue) FROM employee
  WHERE employeeid in (1,2,4) and rank(revenue)<6
Result: Cache miss. (Step 884 in FIG. 8C)

Example 28

Cache query: SELECT siteid, productid, qtysold FROM sales
  WHERE rank(qtysold)<100
New query: SELECT siteid, productid, qtysold, aggregate (qtysold BY siteid)
  FROM sales
  WHERE rank(qtysold)<100 AND aggregate(qtysold BY siteid)>1000
Result: Cache miss. (Step 884 in FIG. 8C)

Example 29

Cache query: SELECT employeeid, rank(qtysold), revenue FROM employee
  WHERE employeeid<5 and rank(revenue)<6
New query: SELECT employeeid, log(revenue) FROM employee
  WHERE employeeid in (1,2,4) and rank(revenue)<6
Result: Cache hit. (Step 888 in FIG. 8C)

What is claimed is:

1. A non-transitory computer-usable storage medium storing instructions executable by a processor, said instructions comprising:
  a first set of instructions configured to maintain a select list index of a plurality of cached queries, wherein
    said select list index comprises key field entries and data item field entries,
    said select list index stores one or more unique items,
    each of said one or more unique items is extracted from a clause of a statement of at least one cached query of said plurality of cached queries,
    said plurality of cached queries are stored in a cache,
    each key field entry stores a unique item of said one or more unique items,
    said each key field entry is associated with a corresponding data item field entry of said data item field entries,
    said corresponding data item field entry is configured to store information identifying said at least one cached query that comprises said unique item stored in said each key field entry, and
    at least one of said one or more unique items comprises a precomputed aggregate from a previously cached query; and
  a second set of instructions configured to determine a list of candidate queries configured to be used to answer a new query that includes at least a first unique item and a second unique item, wherein
    the list of candidate queries is determined based on an intersection of a first set of cached queries that include the first unique item and a second set of cached queries that include the second unique item.

2. The non-transitory computer-usable storage medium of claim 1, wherein
  said list of candidate queries comprises a subset of said plurality of cached queries,
  said new query comprises a new query aggregate,
  said new query uses a cross-section of results of previously computed non-identical queries,
  said new query aggregate does not exactly match any of said unique items in said select list index,
  said aggregate in said select list is evaluated to be usable for performing aggregate roll-up for said new query aggregate, and
  said at least one cached query that comprises said aggregate is identified as a candidate query to potentially be used to answer said new query.

3. The non-transitory computer-usable storage medium of claim 1, wherein
  said one or more unique items further comprise a first unique item, wherein said first unique item is an expression comprising a mathematical operator.

4. A non-transitory computer-usable storage medium storing instructions executable by a processor, said instructions comprising:
  a first set of instructions configured to maintain an index of a plurality of aggregates, wherein
    said index comprises key field entries and data item field entries,
    said index stores one or more unique items comprising a precomputed aggregate from a previously cached query,
    each of said one or more unique items is aggregated upon by one or more aggregates extracted from a clause of a statement of at least one cached query of a plurality of cached queries,
    said plurality of cached queries are stored in a cache, and
    each key field entry stores a unique item of said one or more unique items, said each key field entry is associated with a corresponding data item field entry of said data item field entries, said corresponding data item field entry is configured to store information identifying said one or more aggregates that operate upon said unique item, wherein said one or more aggregates are drawn from a select list index; and a second set of instructions configured to access said index and rewrite a selected aggregate in a new query, said second set of instructions is configured to rewrite said selected aggregate only if an exact match for said selected aggregate cannot be found in said select list index.

5. The non-transitory computer-usable storage medium of claim 4, wherein said one or more unique items further comprise a first unique item, said first unique item is a first subexpression generated by a decomposition of an expression.

6. The non-transitory computer-usable storage medium of claim 4, wherein said one or more aggregates in said data item field comprise only distributive aggregates.

7. The non-transitory computer-usable storage medium of claim 5, wherein, said decomposition comprises storing a first portion of said expression in said index, and said decomposition further comprises excluding from said first portion a mathematical operator and a constant.

8. The non-transitory computer-usable storage medium of claim 1, wherein, said one or more unique items further comprise a first unique item and a second unique item, said first unique item is a first subexpression generated by a decomposition of an expression, said second unique item is a second subexpression generated by said decomposition of said expression, said decomposition comprises storing as said first unique item a first portion of
said expression in said select list index, said decomposition further comprises storing as said second unique item a second portion of said expression in said select list index, and said first portion and said second portion are distinct.

9. The non-transitory computer-usable storage medium of claim 8, wherein, said new query uses a cross-section of results of previously computed non-identical queries, said new query comprises an expression comprising a mathematical operator, said first unique item, and said second unique item, and said list of candidate queries comprises an intersection of cached queries for said first unique item and said second unique item.

10. The non-transitory computer-usable storage medium of claim 1, wherein said select list index is revised to reflect additions to and deletions from said cache.

11. The non-transitory computer-usable storage medium of claim 4, wherein said select list index comprises one entry for each of said one or more unique items, and each entry corresponds to a set of cached queries that comprise said each unique item.

12. The non-transitory computer-usable storage medium of claim 4, wherein said index is revised to reflect additions to and deletions from said cache.

13. The non-transitory computer-usable storage medium of claim 4, wherein said select list index is revised to reflect said additions to and said deletions from said cache.

14. The non-transitory computer-usable storage medium of claim 4, wherein said instructions configured to rewrite said selected aggregate are limited to rolling up results of said one or more aggregates.

15. The non-transitory computer-usable storage medium of claim 4, wherein said instructions configured to rewrite said selected aggregate further comprise a third set of instructions configured to perform a rewrite evaluation of said at least one cached query that comprises said at least one aggregate, and said rewrite evaluation comprises a check to ensure that all columns associated with said selected aggregate are present in said at least one cached query.

16. The non-transitory computer-usable storage medium of claim 4, further comprising a third set of instructions configured to ensure that all filters of said are compatible with said selected aggregate.

17. The non-transitory computer-usable storage medium of claim 16, wherein said filters comprise a where clause.

18. The non-transitory computer-usable storage medium of claim 16, wherein said filters comprise a having clause.

19. The non-transitory computer-usable storage medium of claim 4, wherein said selected aggregate operates on a new query item, said new query item matches at least one unique item in said index, at least one aggregate of said one or more aggregates that operate upon said one unique item is evaluated to be usable for performing aggregate rewrite for said selected aggregate, and said selected aggregate in said new query is rewritten in terms of said at least one aggregate of said one or more aggregates.

20. The non-transitory computer-usable storage medium of claim 2, wherein said at least one cached query identified as said candidate query is part of a first set of potential candidate queries, said new query comprises a new query item that matches one of said unique items in said select list index, a second subset of cached queries comprising said one unique item are identified as a second set of potential candidate queries, and said list is determined by intersecting said first set of potential candidate queries with said second set of potential candidate queries.

* * * * *

UNITED STATES PATENT AND TRADEMARK OFFICE
CERTIFICATE OF CORRECTION

PATENT NO. : 9,563,662 B2
APPLICATION NO. : 11/931947
DATED : February 7, 2017
INVENTOR(S) : Schneider et al.

It is certified that error appears in the above-identified patent and that said Letters Patent is hereby corrected as shown below:

In the Drawings

On sheet 1 of 12, in FIG. 1, under Reference Numeral 132, Line 1, delete "Nagivation" and insert -- Navigation --, therefor.

In the Specification

In Column 3, Line 3, after "hit" insert -- . --.

In Column 19, Line 44, delete "and or" and insert -- and/or --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*